US012812118B2

(12) United States Patent
Clucas et al.

(10) Patent No.: US 12,812,118 B2
(45) Date of Patent: Nov. 24, 2026

(54) DIGITAL IMAGE PROCESSING

(71) Applicant: V-NOVA INTERNATIONAL LIMITED, London (GB)

(72) Inventors: Richard Clucas, London (GB); Amaya Jiménez Moreno, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

(21) Appl. No.: 18/720,447

(22) PCT Filed: Dec. 15, 2022

(86) PCT No.: PCT/GB2022/053249
§ 371 (c)(1),
(2) Date: Jun. 14, 2024

(87) PCT Pub. No.: WO2023/111574
PCT Pub. Date: Jun. 22, 2023

(65) Prior Publication Data

US 2025/0063173 A1 Feb. 20, 2025

(30) Foreign Application Priority Data

Dec. 17, 2021 (GB) ..................................... 2118364

(51) Int. Cl.
*H04N 19/132* (2014.01)
*G06T 5/70* (2024.01)
(Continued)

(52) U.S. Cl.
CPC ............. *H04N 19/132* (2014.11); *G06T 5/70* (2024.01); *H04N 19/147* (2014.11);
(Continued)

(58) Field of Classification Search
CPC .... H04N 19/132; H04N 19/147; H04N 19/33; H04N 19/86; H04N 19/182
See application file for complete search history.

(56) References Cited

U.S. PATENT DOCUMENTS

2002/0089701 A1 7/2002 Lu et al.
2009/0180555 A1 7/2009 Sun
(Continued)

FOREIGN PATENT DOCUMENTS

EP 2770721 8/2014

OTHER PUBLICATIONS

International Preliminary Report on Patentability received for PCT Patent Application No. PCT/GB2022/053249, mailed on Jun. 27, 2024, 7 pages.
(Continued)

*Primary Examiner* — On S Mung
(74) *Attorney, Agent, or Firm* — Workman Nydegger

(57) ABSTRACT

There is provided a method of introducing dither to reduce banding artefacts in a digital image resulting from an operation applied to the digital image to reduce the pixel bit depth. The bit depth reduction produces a reduced bit depth version of the digital image which results in pixel information loss. The method comprises applying a mask to the digital image prior to encoding the digital image at the reduced bit depth. The mask indicates a pattern for selective adjustment of the pixel values in the reduced bit depth version of the digital image. The method comprises for each pixel in the digital image: determining the pixel's location in the mask and if the mask pattern indicates selective adjustment then determining a pixel adjustment factor from the pixel information lost during the bit depth reduction and applying the pixel adjustment factor to the reduced bit depth version of the pixel. The mask pattern indicates no selective
(Continued)

adjustment for at least one pixel and indicates applying selective adjustment to at least one pixel in five in the horizontal direction, and at least one pixel in five in the vertical direction of the digital image.

24 Claims, 17 Drawing Sheets

(51) Int. Cl.

*H04N 19/147* (2014.01)
*H04N 19/182* (2014.01)
*H04N 19/33* (2014.01)
*H04N 19/86* (2014.01)

(52) U.S. Cl.

CPC ........... *H04N 19/182* (2014.11); *H04N 19/33* (2014.11); *H04N 19/86* (2014.11); *G06T 2207/10016* (2013.01)

(56) References Cited

U.S. PATENT DOCUMENTS

| | | | | |
|---|---|---|---|---|
| 2011/0135011 | A1 | 6/2011 | Eddy | |
| 2015/0213750 | A1* | 7/2015 | Luo | G09G 3/2051 345/597 |
| 2022/0103832 | A1* | 3/2022 | Grois | H04N 19/132 |

OTHER PUBLICATIONS

International Search Report and Written Opinion received for PCT Patent Application No. PCT/GB2022/053249, mailed on Mar. 13, 2023, 9 pages.
Office Action received for GB Patent Application No. 2118364.5, mailed on Jul. 25, 2024, 4 pages.
"[LCEVC]—Draft DIS DoC", 132. MPEG Meeting; Oct. 12, 2020-Oct. 16, 2020; Online; (Motion Picture Expert Group or ISO/IEC JTC1/SC29/WG11), No. m55159 Sep. 30, 2020 (Sep. 30, 2020), XP030292680, Retrieved from the Internet: URL:https://dms.mpeg.expert/doc_end_user/documents/132_OnLine/wgll/m55159-vl-m55159-DraftDISDoC.zip m55159—Draft DIS DoC/ISO_IEC_DIS_23094-2-Word_with_trackchanges_(DIS_edit) (en) - 30.SEP.20.docx [retrieved on Sep. 30, 2020].
PCT/GB2022/053249 International Preliminary Report on Patentability Jun. 27, 2024 (7 pages).
PCT/GB2022/053249 International Search Report Mar. 13, 2023.
PCT/GB2022/053249 Written Opinion of the International Searching Authority Mar. 13, 2023 (9 pages).
GB2118364.5 Combined Search and Examination Report Sep. 8, 2022.
International Search Report for application No. PCT/GB2022/053249 mailed on Jun. 22, 2023.
Written Opinion of the International Searching Authority for application No. PCT/GB2022/053249 mailed on Jun. 22, 2023.
Office Action received for IN Patent Application No. 202417052814, mailed on Oct. 31, 2025, 6 pages.

* cited by examiner

The value of pixel (0,0) is:
0010100011
9876543210
Bit number
e.g., bit 0=1 and bit 6=0

10 bit digital image (810)

| Y\X | 0 | 1 | 2 | 3 |
|---|---|---|---|---|
| 0 | 0010100011 | 0010100011 | 0010100001 | 0010100011 |
| 1 | 0010100010 | 0010100011 | 0010100000 | 0010100010 |
| 2 | 0010100100 | 0010100001 | 0010100010 | 0010100001 |
| 3 | 0010100011 | 0010100101 | 0010100000 | 0010100010 |

8 bit digital image (830)

| Y\X | 0 | 1 | 2 | 3 |
|---|---|---|---|---|
| 0 | 00101000 | 00101000 | 00101000 | 00101000 |
| 1 | 00101000 | 00101000 | 00101000 | 00101000 |
| 2 | 00101001 | 00101000 | 00101000 | 00101000 |
| 3 | 00101000 | 00101001 | 00101000 | 00101000 |

840

Mask

Adjustment rule (944)

| | Bits Lost | | | |
|---|---|---|---|---|
| | 00 | 01 | 10 | 11 |
| (black) | No Change | No Change | Add 1 to bit 2 | Add 1 to bit 2 |
| (white) | No Change | No Change | No Change | No Change |

Adjusted 8 bit digital image (850)

| Y\X | 0 | 1 | 2 | 3 |
|---|---|---|---|---|
| 0 | 0010100**1** | 00101000 | 00101000 | 00101000 |
| 1 | 00101000 | 0010100**1** | 00101000 | 0010100**1** |
| 2 | 00101001 | 00101000 | 0010100**1** | 00101000 |
| 3 | 00101000 | 00101001 | 00101000 | 0010100**1** |

10 bit digital image (810)

| Y\X | 0 | 1 | 2 | 3 |
|---|---|---|---|---|
| 0 | 0010100011 | 0010100011 | 0010100001 | 0010100011 |
| 1 | 0010100010 | 0010100011 | 0010100000 | 0010100010 |
| 2 | 0010100100 | 0010100001 | 0010100010 | 0010100001 |
| 3 | 0010100011 | 0010100101 | 0010100000 | 0010100010 |

8 bit digital image (830)

| Y\X | 0 | 1 | 2 | 3 |
|---|---|---|---|---|
| 0 | 00101000 | 00101000 | 00101000 | 00101000 |
| 1 | 00101000 | 00101000 | 00101000 | 00101000 |
| 2 | 00101001 | 00101000 | 00101000 | 00101000 |
| 3 | 00101000 | 00101001 | 00101000 | 00101000 |

840

Mask

Adjustment rule (1044)

| | Bits Lost | | | |
|---|---|---|---|---|
| | 00 | 01 | 10 | 11 |
| | Add -1 to bit 2 | Add -1 to bit 2 | No Change | No Change |
| | No Change | No Change | No Change | No Change |

Adjusted 8 bit digital image (850)

| Y\X | 0 | 1 | 2 | 3 |
|---|---|---|---|---|
| 0 | 00101000 | 00101000 | 0010**0111** | 00101000 |
| 1 | 00101000 | 00101000 | 00101000 | 00101000 |
| 2 | 0010100**0** | 00101000 | 00101000 | 00101000 |
| 3 | 00101000 | 0010100**0** | 00101000 | 00101000 |

| Y\X | 0 | 1 | 2 | 3 |
| --- | --- | --- | --- | --- |
| 0 | 0010100011 | 0010100011 | 0010100001 | 0010100011 |
| 1 | 0010100010 | 0010100011 | 0010100000 | 0010100010 |
| 2 | 0010100100 | 0010100001 | 0010100010 | 0010100001 |
| 3 | 0010100011 | 0010100101 | 0010100000 | 0010100010 |

| Y\X | 0 | 1 | 2 | 3 |
| --- | --- | --- | --- | --- |
| 0 | 00101000 | 00101000 | 00101000 | 00101000 |
| 1 | 00101000 | 00101000 | 00101000 | 00101000 |
| 2 | 00101001 | 00101000 | 00101000 | 00101000 |
| 3 | 00101000 | 00101001 | 00101000 | 00101000 |

| | Bits Lost | | | |
| --- | --- | --- | --- | --- |
| | 00 | 01 | 10 | 11 |
| (black) | No Change | No Change | Add 1 to bit 2 | Add 1 to bit 3 |
| (white) | No Change | No Change | No Change | No Change |

| Y\X | 0 | 1 | 2 | 3 |
| --- | --- | --- | --- | --- |
| 0 | 00101010 | 00101000 | 00101000 | 00101000 |
| 1 | 00101000 | 00101010 | 00101000 | 00101001 |
| 2 | 00101001 | 00101000 | 00101001 | 00101000 |
| 3 | 00101000 | 00101001 | 00101000 | 00101001 |

DIGITAL IMAGE PROCESSING

CROSS-REFERENCE TO RELATED APPLICATIONS

This application is a 371 US Nationalization of International Application No. PCT/GB2022/053249, filed Dec. 15, 2022, which claims priority from GB Patent Application No: 2118364.5, filed Dec. 17, 2021, the disclosures of which are hereby incorporated herein by reference in their entirety.

TECHNICAL FIELD

The present disclosure describes a method for processing a signal. Particularly, but not exclusively, the application relates to a method for processing a signal undergoing a reduction in bit depth. Particularly, but not exclusively, the signal represents a digital image.

BACKGROUND

When changing the bit depth of a digital image from a higher bit depth to a lower bit depth, digital artefacts may appear in the form of bands. The bands arise due to loss of granularity in the pixel information relating to each pixel. Thus, pixels which have differing luminance or chrominance values at a high bit depth end up having the same luminance or chrominance values at a lower bit depth which reduces the perceived quality of an image. When said lower bit depth image is encoded, the decoder would produce a reconstruction of a digital image that suffers from bands in the luminance and/or chrominance planes.

In tier-based coding formats such as ISO/IEC MPEG-5 Part 2 LCEVC (hereafter "LCEVC"), or SMPTE VC-6 2117 (hereafter "VC-6"), a signal is decomposed in multiple "echelons" (also known as "hierarchical tiers") of data, each corresponding to a "Level of Quality" ("LoQ") of the signal, from the highest echelon which may be at the bit depth of the original signal to a lowest echelon, which typically has a lower bit depth than the original signal. Different echelons contain information on corrections to apply to a reconstructed rendition in order to produce the final output. Echelons may be based on residual information, e.g. a difference between a version of the original signal at a particular level of quality and a reconstructed version of the signal at the same level of quality. A lowest echelon may not comprise residual information but may comprise a lowest bit depth of the original signal. The decoded signal at a given Level of Quality is reconstructed by first decoding the lowest echelon (thus reconstructing the signal at the first—lowest—Level of Quality), then predicting a rendition of the signal at the second—next higher—Level of Quality, then decoding the corresponding second echelon of reconstruction data (also known as "residual data" at the second Level of Quality), then combining the prediction with the reconstruction data so as to reconstruct the rendition of the signal at the second-higher-Level of Quality, and so on, up to reconstructing the given Level of Quality. Reconstructing the signal may comprise decoding residual data and using this to correct a version at a particular Level of Quality that is derived from a version of the signal from a lower Level of Quality.

In the example of the hierarchical tier coding systems such as LCEVC and VC-6, if the signal at the lower level of quality has banding issues these banding issues are normally resolved by the residual information which carry the granular pixel information that were lost during the bit depth reduction. However, if lossy compression is used to compress the residual information then the granular pixel information will be lost allowing the banding issue to appear at the decoder side. Additionally, the banding issue will be amplified with each higher level of quality reconstruction at the decoder. Thus, reducing the perceived quality of the signal.

The present disclosure considers a solution to the problem of banding artifacts caused by a reduction in pixel bit depth.

SUMMARY

According to an aspect of the invention, there is provided a method of introducing dither to reduce banding artefacts in a digital image resulting from an operation applied to the digital image to reduce the pixel bit depth. The bit depth reduction produces a reduced bit depth version of the digital image which results in pixel information loss. The method comprises applying a mask to the digital image prior to encoding the digital image at the reduced bit depth. The mask indicates a pattern for selective adjustment of the pixel values in the reduced bit depth version of the digital image. The method comprises for each pixel in the digital image: determining the pixel's location in the mask and if the mask pattern indicates selective adjustment then determining a pixel adjustment factor from the pixel information lost during the bit depth reduction and applying the pixel adjustment factor to the reduced bit depth version of the pixel. The mask pattern indicates no selective adjustment for at least one pixel and indicates applying selective adjustment to at least one pixel in five in the horizontal direction, and at least one pixel in five in the vertical direction of the digital image.

In this way, a reduced bit depth version of the digital image can be produced with enhanced perceived quality by selectively (from the mask), changing pixels using discarded information which had previously provided subtle changes in colour and/or luminance. Any banding artefacts in the digital image will be mitigated in the reduced bit depth version of the digital image. In addition, applying selective changes using the mask and the discarded information, for example instead of processing the image to uncover areas and locations of possible banding artefacts for specific remedy, reduces the processing power necessary and increases the speed of processing the digital image.

Benefits arise from performing the method at an encoder prior to encoding because if the method was performed at a decoder then the decoder would have to know the pixel information that has been discarded, and so, in effect, the original signal would need to be sent from this additional signalling.

Additionally, and in the context of hierarchical coding systems such as LCEVC and VC-6, encoding the adjusted reduced bit depth version of the digital image will reduce banding artefacts at higher echelons. This is because at higher echelons the residual data may be encoded with losses, and minor adjustments to pixels signalled in the residual data, for example to deal with a corresponding increase in the bit depth at a decoder, would not be retained in the residual data when the residual data is encoded. This would be especially pronounced for complex digital images and for digital images with sharp transitions, and in situations where there is limited bandwidth relative to the desired signal size.

The bit depth reduction converts the bit depth of the pixels from a first bit depth to a second bit depth. The difference between the first bit depth and the second bit depth may be 1 bit, 2 bits, 3 bits, 4 bits. Typically, the difference is 2 bits.

Preferably, the first bit depth may be 8 bits, 9 bits, 10 bits, 11 bits, 12 bits, 13 bits, 14 bits, or more. The second bit depth may be correspondingly less, for example 1 bit, 2 bits, 3 bits, or 4 bits less. Typically, the difference is 2 bits.

Preferably, the pixel adjustment factor may be determined based on the value of the most significant bit of the pixel information lost during the bit depth reduction.

Preferably, the pixel adjustment factor may increase the value of the reduced bit depth version of the pixel by 1 when the most significant bit of the pixel information lost is 1, and the pixel adjustment factor may make no change when the most significant bit of the pixel information lost is 0.

Preferably, the pixel adjustment factor may make no change to the value of the reduced bit depth version of the pixel when the most significant bit of the pixel information lost is 1 and may decrease the reduced bit depth version of the pixel by 1 when the most significant bit of the pixel information lost is 0.

Preferably, the pixel adjustment factor may be determined based on a value of a single bit of the pixel information lost during the bit depth reduction regardless of the significance.

Preferably, the pixel adjustment factor may be determined based on the value of each bit lost during the bit depth reduction.

Preferably, the influence of each bit lost during the bit depth reduction on the pixel adjustment factor may be dependent on the significance of said bit.

Preferably, a more significant bit may have a greater influence than a lower significant bit.

Preferably, when the pixel adjustment factor is derived from two lost bits, the pixel adjustment factor may cause the reduced bit depth pixel to be adjusted by a value in of one of the following adjustment groups: 1, 0, −1; and −2, −1, 0, 1 or 2 depending on the value of the pixel information lost during the bit depth reduction.

Preferably, the pixel adjustment factor may increase the value of the reduced bit depth version of the pixel by 1 when the two most significant bits of the pixel information lost are 10 and the pixel adjustment factor may increase the value of the reduced bit depth version of the pixel by 2 when the two most significant bits of the pixel information lost are 11, and otherwise may not change the value of the reduced bit depth version of the pixel.

Preferably, the mask may indicate applying the pixel adjustment factor to one pixel in two in the horizontal direction, and one pixel in two in the vertical direction.

Preferably, the mask may indicate applying the pixel adjustment factor to one pixel in two in the horizontal direction, and one pixel in two in the vertical direction for a first portion of the digital image using a pixel adjustment pattern; and the mask may indicate an inverse of the pixel adjustment pattern to be applied to a different second portion of the digital image.

Preferably, the mask pattern may indicate multiple levels of selective adjustment, wherein each level of selective adjustment may have a different influence on the likelihood of applying the pixel adjustment factor.

Preferably, the multiple levels may signal three adjustment levels as follows: zero adjustment, first level adjustment, and second level adjustment.

Preferably, the zero adjustment may indicate no selective adjustment, the first level adjustment may make no change to when the pixel adjustment factor is applied and the second level adjustment may increase the value of the reduced bit depth version of the pixel by 1 only when the two most significant bits of the pixel information lost are 11.

Preferably, the method may be applied to at least one of the luminance values and the chrominance values of each pixel.

Preferably, the method may be performed as part of a hierarchical coding scheme.

Preferably, the method may comprise encoding, at a set of encoders, signals derived from the digital image and the reduced bit depth version of the digital image.

Preferably, the encoding at the set of encoders may comprise encoding a signal derived from the digital image using a first encoding method and a single derived from the reduced bit depth version of the digital image using a second encoding method. The first encoding method and the second encoding method may be different and output part of an LCEVC encoded signal.

Preferably, the encoding at the set of encoders may comprise encoding a signal derived from the digital image using a first encoding method and a single derived from the reduced bit depth version of the digital image using a second encoding method. The first encoding method and the second encoding method may be the same and wherein the first encoding method and the second encoding method may generate at least part of a VC-6 encoded signal.

According to a second a aspect of the invention, there is provided a computer program adapted to perform the steps of the first aspect of the invention.

According to a third aspect of the invention, there is provided a data processing apparatus comprising a processor and memory. The apparatus being adapted to carry out the steps of the first aspect of the invention.

BRIEF DESCRIPTION OF THE DRAWINGS

The invention shall now be described, by way of example only, with reference to the accompanying drawings in which.

DETAILED DESCRIPTION

Introduction

Figure 1:
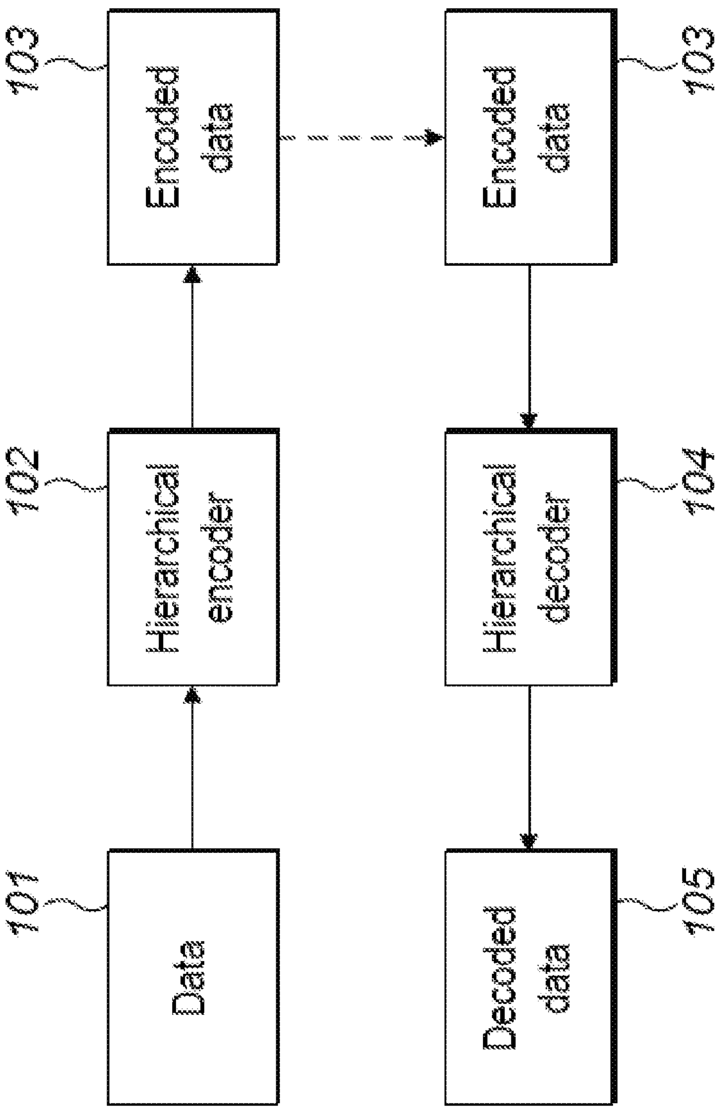
FIG. 1 shows a high-level schematic of a hierarchical encoding and decoding process.

Examples described herein relate to signal processing. A signal may be considered as a sequence of samples (i.e., two-dimensional images, video frames, video fields, sound frames, etc.). In the description, the terms "image", "picture" or "plane" (intended with the broadest meaning of "hyper-plane", i.e., array of elements with any number of dimensions and a given sampling grid) will be often used to identify the digital rendition of a sample of the signal along the sequence of samples, wherein each plane has a given resolution for each of its dimensions (e.g., X and Y), and comprises a set of plane elements (or "element", or "pel", or display element for two-dimensional images often called "pixel", for volumetric images often called "voxel", etc.) characterized by one or more "values" or "settings" (e.g., by ways of non-limiting examples, colour settings in a suitable colour space, settings indicating density levels, settings indicating temperature levels, settings indicating audio pitch, settings indicating amplitude, settings indicating depth, settings indicating alpha channel transparency level, etc.). Each plane element is identified by a suitable set of coordinates, indicating the integer positions of said element in the sampling grid of the image. Signal dimensions can include only spatial dimensions (e.g., in the case of an image) or also a time dimension (e.g., in the case of a signal evolving over time, such as a video signal).

As examples, a signal can be an image, an audio signal, a multi-channel audio signal, a telemetry signal, a video signal, a 3DoF/6DoF video signal, a volumetric signal (e.g., medical imaging, scientific imaging, holographic imaging, etc.), a volumetric video signal, or even signals with more than four dimensions.

For simplicity, examples described herein often refer to signals that are displayed as 2D planes of settings (e.g., 2D images in a suitable colour space), such as for instance a video signal. The terms "frame" or "field" will be used interchangeably with the term "image", so as to indicate a sample in time of the video signal: any concepts and methods illustrated for video signals made of frames (progressive video signals) can be easily applicable also to video signals made of fields (interlaced video signals), and vice versa. Despite the focus of embodiments illustrated herein on image and video signals, people skilled in the art can easily understand that the same concepts and methods are also applicable to any other types of multidimensional signal (e.g., audio signals, volumetric signals, stereoscopic video signals, 3DoF/6DoF video signals, plenoptic signals, point clouds, etc.).

Certain tier-based hierarchical formats described herein use a varying amount of correction (e.g., in the form of also "residual data", or simply "residuals") in order to generate a reconstruction of the signal at the given level of quality that best resembles (or even losslessly reconstructs) the original. The amount of correction may be based on a fidelity of a predicted rendition of a given level of quality.

Examples of a Tier-Based Hierarchical Coding Scheme or Format

In preferred examples, the encoders or decoders are part of a tier-based hierarchical coding scheme or format. Examples of a tier-based hierarchical coding scheme include LCEVC: MPEG-5 Part 2 LCEVC ("Low Complexity Enhancement Video Coding") and VC-6: SMPTE VC-6 ST-2117, the former being described in WO/2020/188273 (and the associated standard document) and the latter being described in WO/2019/111010 (and the associated standard document), all of which are incorporated by reference herein. However, the concepts illustrated herein need not be limited to these specific hierarchical coding schemes.

Figure 4:
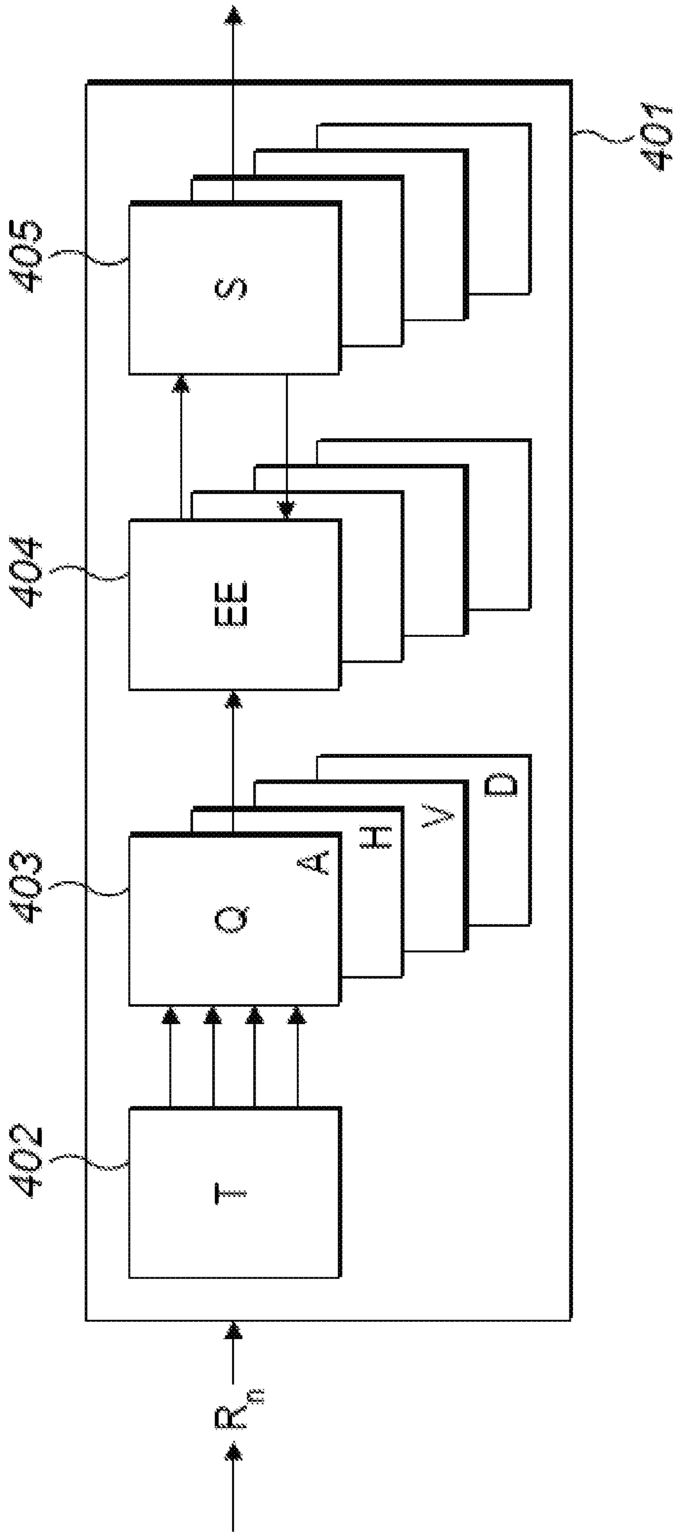
FIG. 4 shows a high-level schematic of an encoding process suitable for encoding the residuals of tiered outputs.
Figure 5:
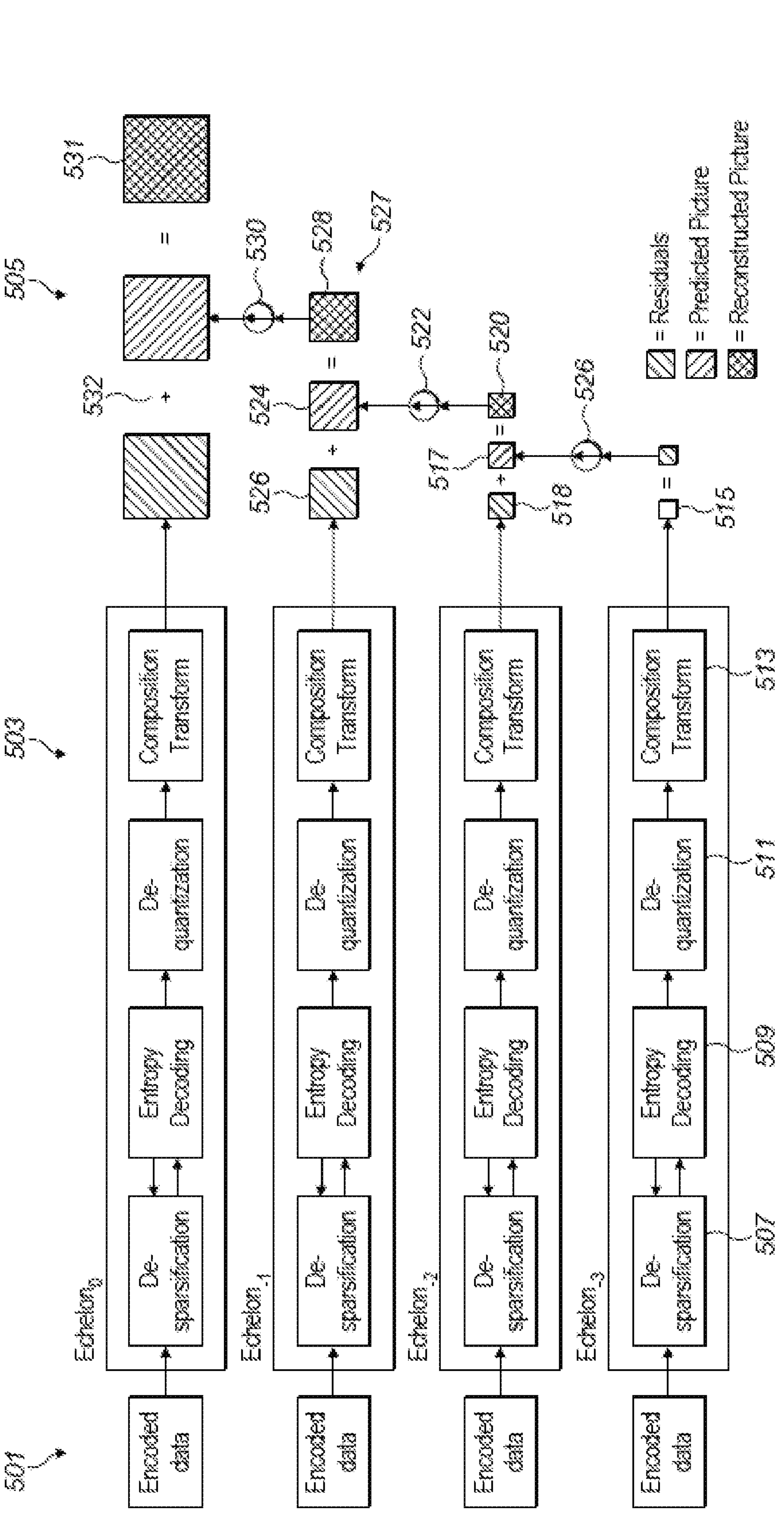
FIG. 5 shows a high-level schematic of a hierarchical decoding process suitable for decoding each output level from FIG. 4.
Figure 6:
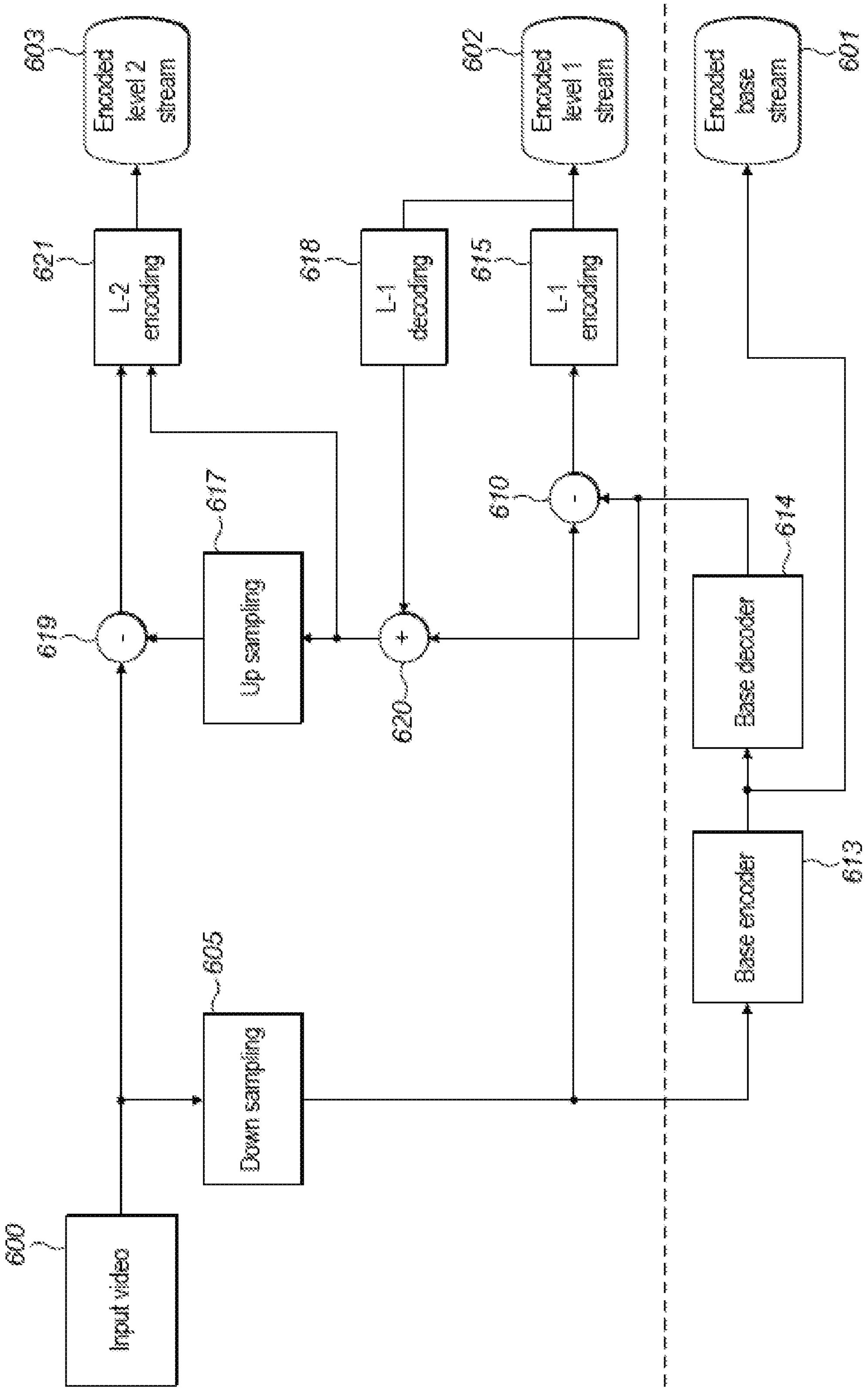
FIG. 6 shows a high-level schematic of an encoding process of a hierarchical coding technology; and, FIG. 7 shows a high-level schematic of a decoding process suitable for decoding the output of FIG. 6.
Figure 7:
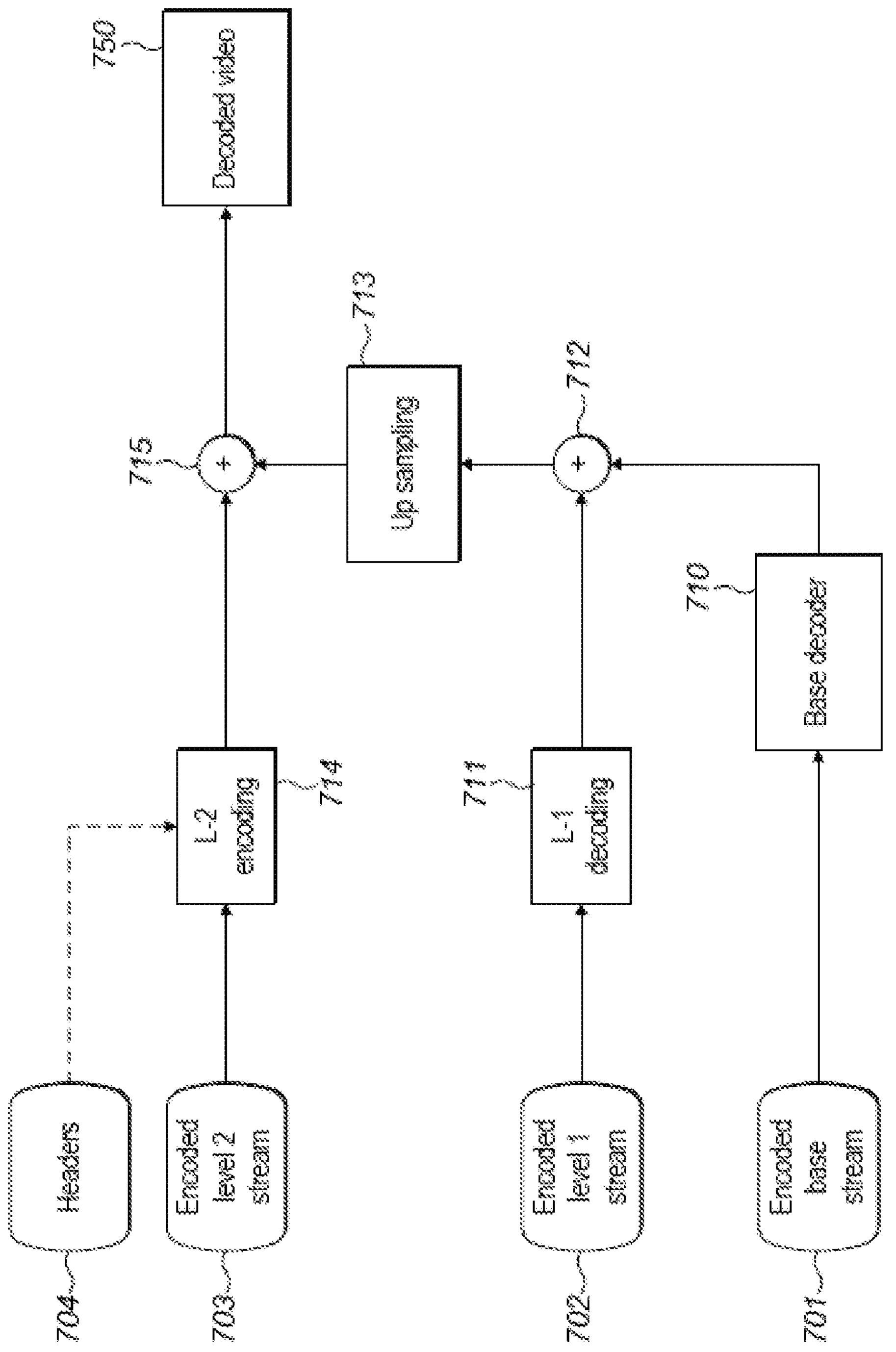

FIGS. 1 to 7 provide an overview of different example tier-based hierarchical coding formats. These are provided as context for the addition of further signal processing operations, which are set out in the figures following FIG. 7. FIGS. 1 to 5 provide examples similar to the implementation of SMPTE VC-6 ST-2117, whereas FIGS. 6 and 7 provide examples similar to the implementation of MPEG-5 Part 2 LCEVC. It may be seen that both sets of examples utilise common underlying operations (e.g., downsampling, upsampling and residual generation) and may share modular implementing technologies.

FIG. 1 illustrates, very generally, a hierarchical coding scheme. Data to be encoded 101 is retrieved by a hierarchical encoder 102 which outputs encoded data 103. Subsequently, the encoded data 103 is received by a hierarchical decoder 104 which decodes the data and outputs decoded data 105.

Typically, the hierarchical coding schemes used in examples herein create a base or core level, which is a representation of the original data at a lower level of quality and one or more levels of residuals which can be used to recreate the original data at a higher level of quality using a decoded version of the base level data. In general, the term "residuals" as used herein refers to a difference between a value of a reference array or reference frame and an actual array or frame of data. The array may be a one or two-dimensional array that represents a coding unit. For example, a coding unit may be a 2×2 or 4×4 set of residual values that correspond to similar sized areas of an input video frame.

It should be noted that the generalised examples are agnostic as to the nature of the input signal. Reference to "residual data" as used herein refers to data derived from a set of residuals, e.g. a set of residuals themselves or an output of a set of data processing operations that are performed on the set of residuals. Throughout the present description, generally a set of residuals includes a plurality of residuals or residual elements, each residual or residual element corresponding to a signal element, that is, an element of the signal or original data.

In specific examples, the data may be an image or video. In these examples, the set of residuals corresponds to an image or frame of the video, with each residual being associated with a pixel of the signal, the pixel being the signal element.

The methods described herein may be applied to so-called planes of data that reflect different colour components of a video signal. For example, the methods may be applied to different planes of YUV or RGB data reflecting different colour channels. Different colour channels may be processed in parallel. The components of each stream may be collated in any logical order.

A hierarchical coding scheme will now be described in which the concepts of the invention may be deployed. The scheme is conceptually illustrated in FIGS. 2 to 5 and corresponds generally to VC-6 described above. In such encoding techniques, residuals data is used in progressively higher levels of quality. In this proposed technique, a core layer represents the image at a first resolution and subsequent layers in the tiered hierarchy are residual data or adjustment layers necessary for the decoding side to reconstruct the image at a higher resolution. Each layer or level may be referred to as an echelon index, such that the residuals data is data required to correct low quality information present in a lower echelon index. Each layer or echelon index in this hierarchical technique, particularly each residual layer, is often a comparatively sparse data set having many zero value elements. When reference is made to an echelon index, it refers collectively to all echelons or sets of components at that level, for example, all subsets arising from a transform step performed at that level of quality.

In this particular hierarchical manner, the described data structure removes any requirement for, or dependency on, the preceding or proceeding level of quality. A level of quality may be encoded and decoded separately, and without reference to any other layer. Thus, in contrast to many known other hierarchical encoding schemes, where there is a requirement to decode the lowest level of quality in order to decode any higher levels of quality, the described methodology does not require the decoding of any other layer. Nevertheless, the principles of exchanging information described below may also be applicable to other hierarchical coding schemes.

Figure 2:
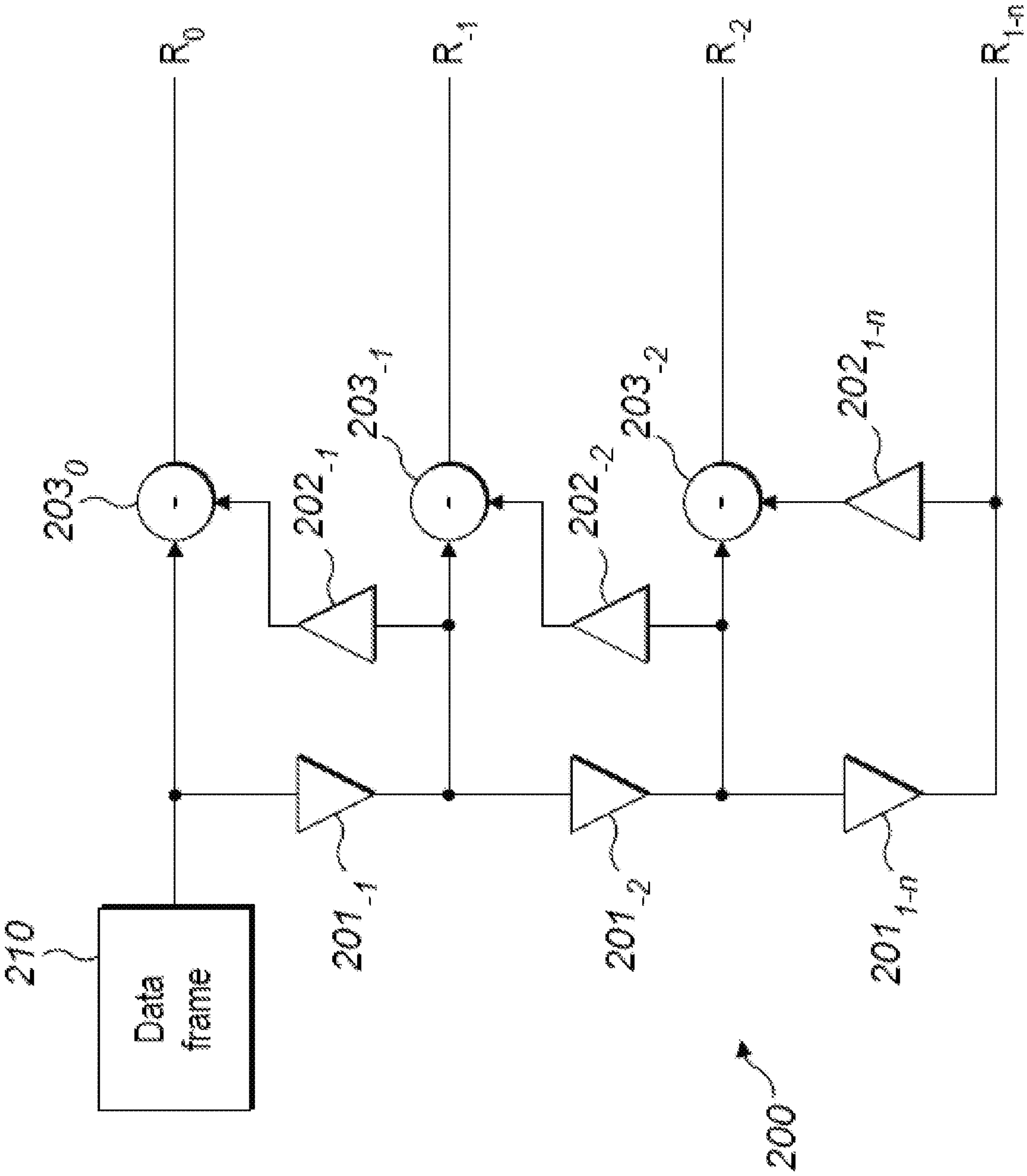
FIG. 2 shows a high-level schematic of a hierarchical deconstruction process.

As shown in FIG. 2, the encoded data represents a set of layers or levels, generally referred to here as echelon indices. The base or core level represents the original data frame 210, albeit at the lowest level of quality or resolution and the subsequent residuals data echelons can combine with the data at the core echelon index to recreate the original image at progressively higher resolutions.

To create the core-echelon index, an input data frame 210 may be down-sampled using a number of down-sampling operations 201 corresponding to the number of levels or echelon indices to be used in the hierarchical coding operation. One fewer down-sampling operation 201 is required than the number of levels in the hierarchy. In all examples illustrated herein with reference to FIGS. 2 to 7, there are 4 levels or echelon indices of output encoded data and accordingly 3 down-sampling operations, but it will of course be understood that these are merely for illustration. Where n indicates the number of levels, the number of down-samplers is n−1. The core level $R_{1-n}$ is the output of the third down-sampling operation. As indicated above, the core level $R_{1-n}$ corresponds to a representation of the input data frame at a lowest level of quality.

To distinguish between down-sampling operations 201, each will be referred to in the order in which the operation is performed on the input data 210 or by the data which its output represents. For example, the third down-sampling operation $\mathbf{201}_{1-n}$ in the example may also be referred to as the core down-sampler as its output generates the core-echelon index or $\text{echelon}_{1-n}$, that is, the index of all echelons at this level is 1−n. Thus, in this example, the first down-sampling operation $\mathbf{201}_{-1}$ corresponds to the $R_{-1}$ down-sampler, the second down-sampling operation $\mathbf{201}_{-2}$ corresponds to the $R_{-2}$ down-sampler and the third down-sampling operation $\mathbf{201}_{1-n}$ corresponds to the core or $R_{-3}$ down-sampler.

As shown in FIG. 2, the data representing the core level of quality $R_{1-n}$ undergoes an up-sampling operation $\mathbf{202}_{1-n}$, referred to here as the core up-sampler. A difference $\mathbf{203}_{-2}$ between the output of the second down-sampling operation $\mathbf{201}_{-2}$ (the output of the $R_{-2}$ down-sampler, i.e. the input to the core down-sampler) and the output of the core up-sampler $\mathbf{202}_{1-n}$ is output as the first residuals data $R_{-2}$. This first residuals data $R_{-2}$ is accordingly representative of the error between the core level $R_{-3}$ and the signal that was used to create that level. Since that signal has itself undergone two down-sampling operations in this example, the first residuals data $R_{-2}$ is an adjustment layer which can be used to recreate the original signal at a higher level of quality than the core level of quality but a lower level than the input data frame 210.

Figure 3:
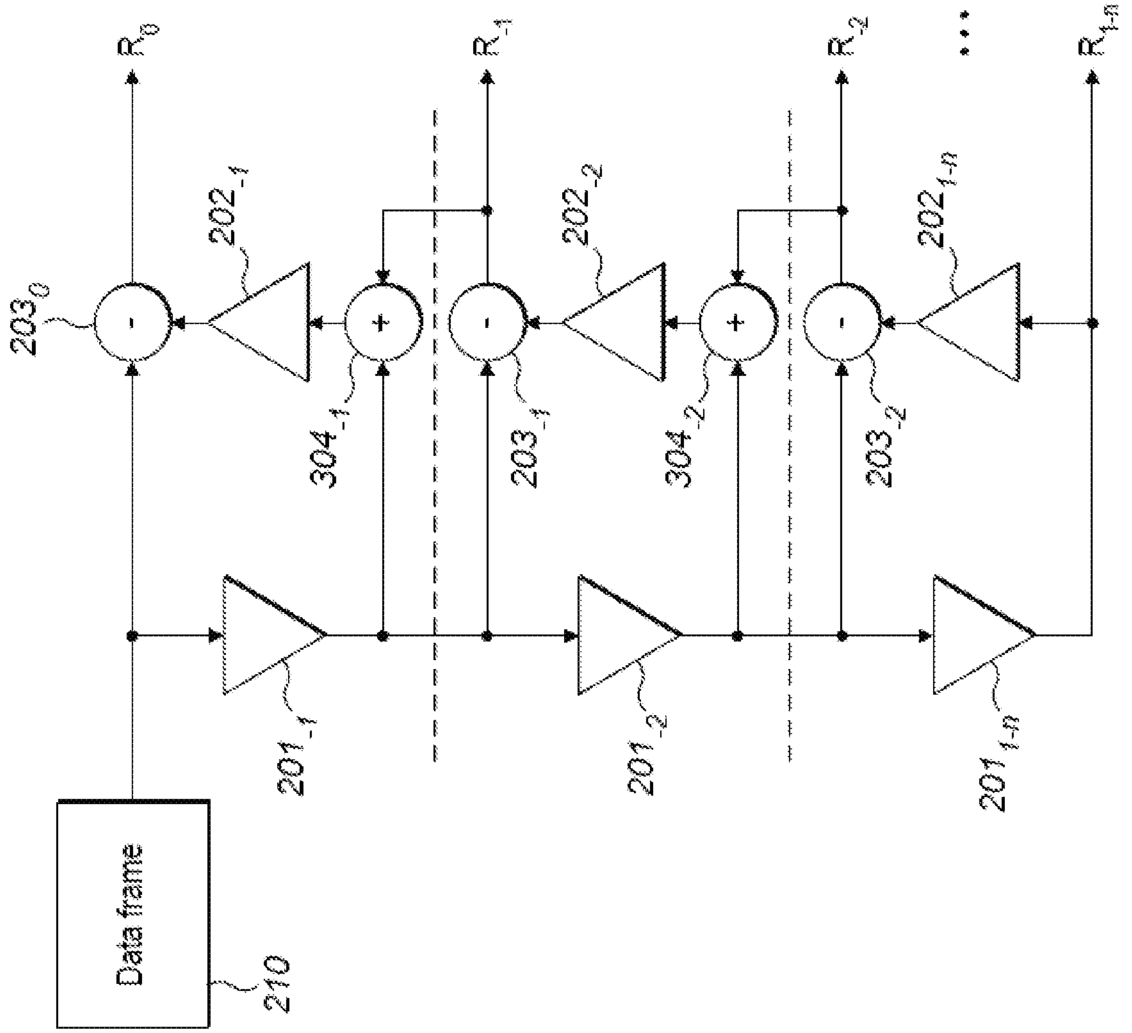
FIG. 3 shows an alternative high-level schematic of a hierarchical deconstruction process.

Variations in how to create residuals data representing higher levels of quality are conceptually illustrated in FIGS. 2 and 3.

In FIG. 2, the output of the second down-sampling operation $\mathbf{201}_{-2}$ (or $R_{-2}$ down-sampler, i.e. the signal used to create the first residuals data $R_{-2}$), is up-sampled $\mathbf{202}_{-2}$ and the difference $\mathbf{203}_{-1}$ between the input to the second down-sampling operation $\mathbf{201}_{-2}$ (or $R_{-2}$ down-sampler, i.e. the output of the $R_{-1}$ down-sampler) is calculated in much the same way as the first residuals data $R_{-2}$ is created. This difference is accordingly the second residuals data $R_{-1}$ and represents an adjustment layer which can be used to recreate the original signal at a higher level of quality using the data from the lower layers.

In the variation of FIG. 3, however, the output of the second down-sampling operation $\mathbf{201}_{-2}$ (or $R_{-2}$ down-sampler) is combined or summed $\mathbf{304}_{-2}$ with the first residuals data $R_{-2}$ to recreate the output of the core up-sampler $\mathbf{202}_{1-n}$. In this variation it is this recreated data which is up-sampled $\mathbf{202}_{-2}$ rather than the down-sampled data. The up-sampled data is similarly compared $\mathbf{203}_{-1}$ to the input to the second down-sampling operation (or $R_{-2}$ down-sampler, i.e. the output of the $R_{-1}$ down-sampler) to create the second residuals data $R_{-1}$.

The variation between the implementations of FIGS. 2 and 3 results in slight variations in the residuals data between the two implementations. FIG. 2 benefits from greater potential for parallelisation.

The process or cycle repeats to create the third residuals $R_0$. In the examples of FIGS. 2 and 3, the output residuals data $R_0$ (i.e. the third residuals data) corresponds to the highest level and is used at the decoder to recreate the input data frame. At this level the difference operation is based on the input data frame which is the same as the input to the first down-sampling operation.

FIG. 4 illustrates an example encoding process 401 for encoding each of the levels or echelon indices of data to produce a set of encoded echelons of data having an echelon index. This encoding process is used merely for example of a suitable encoding process for encoding each of the levels, but it will be understood that any suitable encoding process may be used. The input to the process is a respective level of residuals data output from FIG. 2 or 3 and the output is a set of echelons of encoded residuals data, the echelons of encoded residuals data together hierarchically represent the encoded data.

In a first step, a transform 402 is performed. The transform may be directional decomposition transform as described in WO2013/171173 or a wavelet or discrete cosine transform. If a directional decomposition transform is used, there may be output a set of four components (also referred to as transformed coefficients). When reference is made to an echelon index, it refers collectively to all directions (A, H, V, D), i.e., 4 echelons. The component set is then quantized 403 before entropy encoding. In this example, the entropy encoding operation 404 is coupled to a sparsification step 405 which takes advantage of the sparseness of the residuals data to reduce the overall data size and involves mapping data elements to an ordered quadtree. Such coupling of entropy coding and sparsification is described further in WO2019/111004 but the precise details of such a process is not relevant to the understanding of the invention. Each array of residuals may be thought of as an echelon.

The process set out above corresponds to an encoding process suitable for encoding data for reconstruction according to SMPTE ST 2117, VC-6 Multiplanar Picture Format. VC-6 is a flexible, multi-resolution, intra-only bitstream format, capable of compressing any ordered set of integer element grids, each of independent size but is also designed for picture compression. It employs data agnostic techniques for compression and is capable of compressing low or high bit-depth pictures. The bitstream's headers can contain a variety of metadata about the picture.

As will be understood, each echelon or echelon index may be implemented using a separate encoder or encoding operation. Similarly, an encoding module may be divided into the steps of down-sampling and comparing, to produce the residuals data, and subsequently encoding the residuals or alternatively each of the steps of the echelon may be implemented in a combined encoding module. Thus, the process may be for example be implemented using 4 encoders, one for each echelon index, 1 encoder and a plurality of encoding modules operating in parallel or series, or one encoder operating on different data sets repeatedly.

The following sets out an example of reconstructing an original data frame, the data frame having been encoded using the above exemplary process. This reconstruction process may be referred to as pyramidal reconstruction. Advantageously, the method provides an efficient technique for reconstructing an image encoded in a received set of data, which may be received by way of a data stream, for example, by way of individually decoding different component sets corresponding to different image size or resolution levels, and combining the image detail from one decoded component set with the upscaled decoded image data from a lower-resolution component set. Thus by performing this process for two or more component sets, digital images at the structure or detail therein may be reconstructed for progressively higher resolutions or greater numbers of pixels, without requiring the full or complete image detail of the highest-resolution component set to be received. Rather, the method facilitates the progressive addition of increasingly higher-resolution details while reconstructing an image from a lower-resolution component set, in a staged manner.

Moreover, the decoding of each component set separately facilitates the parallel processing of received component sets, thus improving reconstruction speed and efficiency in implementations wherein a plurality of processes is available.

Each resolution level corresponds to a level of quality or echelon index. This is a collective term, associated with a plane (in this example a representation of a grid of integer value elements) that describes all new inputs or received component sets, and the output reconstructed image for a cycle of index-m. The reconstructed image in echelon index zero, for instance, is the output of the final cycle of pyramidal reconstruction.

Pyramidal reconstruction may be a process of reconstructing an inverted pyramid starting from the initial echelon index and using cycles by new residuals to derive higher echelon indices up to the maximum quality, quality zero, at echelon index zero. A cycle may be thought of as a step in such pyramidal reconstruction, the step being identified by an index-m. The step typically comprises up-sampling data output from a possible previous step, for instance, upscaling the decoded first component set, and takes new residual data as further inputs in order to obtain output data to be up-sampled in a possible following step. Where only first and second component sets are received, the number of echelon indices will be two, and no possible following step is present. However, in examples where the number of component sets, or echelon indices, is three or greater, then the output data may be progressively upsampled in the following steps.

The first component set typically corresponds to the initial echelon index, which may be denoted by echelon index 1-N, where N is the number of echelon indices in the plane.

Typically, the upscaling of the decoded first component set comprises applying an upsampler to the output of the decoding procedure for the initial echelon index. In examples, this involves bringing the resolution of a reconstructed picture output from the decoding of the initial echelon index component set into conformity with the resolution of the second component set, corresponding to 2-N. Typically, the upscaled output from the lower echelon index component set corresponds to a predicted image at the higher echelon index resolution. Owing to the lower-resolution initial echelon index image and the up-sampling process, the predicted image typically corresponds to a smoothed or blurred picture.

Adding to this predicted picture higher-resolution details from the echelon index above provides a combined, reconstructed image set. Advantageously, where the received component sets for one or more higher-echelon index component sets comprise residual image data, or data indicating the pixel value differences between upscaled predicted pictures and original, uncompressed, or pre-encoding images, the amount of received data required in order to reconstruct an image or data set of a given resolution or quality may be considerably less than the amount or rate of data that would be required in order to receive the same quality image using other techniques. Thus, by combining low-detail image data received at lower resolutions with progressively greater-detail image data received at increasingly higher resolutions in accordance with the method, data rate requirements are reduced.

Typically, the set of encoded data comprises one or more further component sets, wherein each of the one or more further component sets corresponds to a higher image resolution than the second component set, and wherein each of the one or more further component sets corresponds to a progressively higher image resolution, the method comprising, for each of the one or more further component sets, decoding the component set so as to obtain a decoded set, the method further comprising, for each of the one or more further component sets, in ascending order of corresponding image resolution: upscaling the reconstructed set having the highest corresponding image resolution so as to increase the corresponding image resolution of the reconstructed set to be equal to the corresponding image resolution of the further component set, and combining the reconstructed set and the further component set together so as to produce a further reconstructed set.

In this way, the method may involve taking the reconstructed image output of a given component set level or echelon index, upscaling that reconstructed set, and combining it with the decoded output of the component set or echelon index above, to produce a new, higher resolution reconstructed picture. It will be understood that this may be performed repeatedly, for progressively higher echelon indices, depending on the total number of component sets in the received set.

In typical examples, each of the component sets corresponds to a progressively higher image resolution, wherein each progressively higher image resolution corresponds to a factor-of-four increase in the number of pixels in a corresponding image. Typically, therefore, the image size corresponding to a given component set is four times the size or number of pixels, or double the height and double the width, of the image corresponding to the component set below, that is the component set with the echelon index one less than the echelon index in question. A received set of component sets in which the linear size of each corresponding image is double with respect to the image size below may facilitate more simple upscaling operations, for example.

In the illustrated example, the number of further component sets is two. Thus, the total number of component sets in the received set is four. This corresponds to the initial echelon index being echelon-3.

The first component set may correspond to image data, and the second and any further component sets correspond to residual image data. As noted above, the method provides particularly advantageous data rate requirement reductions for a given image size in cases where the lowest echelon index, that is the first component set, contains a low resolution, or down sampled, version of the image being transmitted. In this way, with each cycle of reconstruction, starting with a low resolution image, that image is upscaled so as to produce a high resolution albeit smoothed version, and that image is then improved by way of adding the differences between that upscaled predicted picture and the actual image to be transmitted at that resolution, and this additive improvement may be repeated for each cycle. Therefore, each component set above that of the initial echelon index needs only contain residual data in order to reintroduce the information that may have been lost in down sampling the original image to the lowest echelon index.

The method provides a way of obtaining image data, which may be residual data, upon receipt of a set containing data that has been compressed, for example, by way of decomposition, quantization, entropy-encoding, and sparsification, for instance.

The sparsification step is particularly advantageous when used in connection with sets for which the original or pre-transmission data was sparse, which may typically correspond to residual image data. A residual may be a difference between elements of a first image and elements of a second image, typically co-located. Such residual image data may typically have a high degree of sparseness. This may be thought of as corresponding to an image wherein areas of detail are sparsely distributed amongst areas in which details are minimal, negligible, or absent. Such sparse data may be described as an array of data wherein the data are organised in at least a two-dimensional structure (e.g., a grid), and wherein a large portion of the data so organised are zero (logically or numerically) or are considered to be below a certain threshold. Residual data are just one example. Additionally, metadata may be sparse and so be reduced in size to a significant degree by this process. Sending data that has been sparsified allows a significant reduction in required data rate to be achieved by way of omitting to send such sparse areas, and instead reintroducing them at appropriate locations within a received byte set at a decoder.

Typically, the entropy-decoding, de-quantizing, and directional composition transform steps are performed in accordance with parameters defined by an encoder or a node from which the received set of encoded data is sent. For each echelon index, or component set, the steps serve to decode image data so as to arrive at a set which may be combined with different echelon indices as per the technique disclosed above, while allowing the set for each level to be transmitted in a data-efficient manner.

There may also be provided a method of reconstructing a set of encoded data according to the method disclosed above, wherein the decoding of each of the first and second component sets is performed according to the method disclosed above. Thus, the advantageous decoding method of the present disclosure may be utilised for each component set or echelon index in a received set of image data and reconstructed accordingly.

With reference to FIG. 5, a decoding example is now described. A set of encoded data 501 is received, wherein the set comprises four echelon indices, each echelon index comprising four echelons: from $\text{echelon}_0$, the highest resolution or level of quality, to echelon-3, the initial echelon. The image data carried in the $\text{echelon}_{-3}$ component set corresponds to image data, and the other component sets contain residual data for that transmitted image. While each of the levels may output data that can be considered as residuals, the residuals in the initial echelon level, that is echelon-3, effectively correspond to the actual reconstructed image. At stage 503, each of the component sets is processed in parallel so as to decode that encoded set.

With reference to the initial echelon index, or the core-echelon index, the following decoding steps are carried out for each component set $\text{echelon}_{-3}$ to $\text{echelon}_0$.

At step 507, the component set is de-sparsified. De-sparsification may be an optional step that is not performed in other tier-based hierarchical formats. In this example, the de-sparsification causes a sparse two-dimensional array to be recreated from the encoded byte set received at each echelon. Zero values grouped at locations within the two-dimensional array which were not received (owing to there being omitted from the transmitted byte set in order to reduce the quantity of data transmitted) are repopulated by this process. Non-zero values in the array retain their correct values and positions within the recreated two-dimensional array, with the de-sparsification step repopulating the transmitted zero values at the appropriate locations or groups of locations there between.

At step 509, a range decoder, the configured parameters of which correspond to those using which the transmitted data was encoded prior to transmission, is applied to the de-sparsified set at each echelon in order to substitute the encoded symbols within the array with pixel values. The encoded symbols in the received set are substituted for pixel values in accordance with an approximation of the pixel value distribution for the image. The use of an approximation of the distribution, that is relative frequency of each value across all pixel values in the image, rather than the true distribution, permits a reduction in the amount of data required to decode the set, since the distribution information is required by the range decoder in order to carry out this step. As described in the present disclosure, the steps of de-sparsification and range decoding are interdependent, rather than sequential. This is indicated by the loop formed by the arrows in the flow diagram.

At step 511, the array of values is de-quantized. This process is again carried out in accordance with the parameters with which the decomposed image was quantized prior to transmission.

Following de-quantization, the set is transformed at step 513 by a composition transform which comprises applying an inverse directional decomposition operation to the de-quantized array. This causes the directional filtering, according to an operator set comprising average, horizontal, vertical, and diagonal operators, to be reversed, such that the resultant array is image data for $\text{echelon}_{-3}$ and residual data for $\text{echelon}_{-2}$ to $\text{echelon}_0$.

Stage 505 illustrates the several cycles involved in the reconstruction utilising the output of the composition transform for each of the echelon component sets 501. Stage 515 indicates the reconstructed image data output from the decoder 503 for the initial echelon. In an example, the reconstructed picture 515 has a resolution of 64×64. At 516, this reconstructed picture is up-sampled so as to increase its constituent number of pixels by a factor of four, thereby a predicted picture 517 having a resolution of 128×128 is produced. At stage 520, the predicted picture 517 is added to the decoded residuals 518 from the output of the decoder at $\text{echelon}_{-2}$. The addition of these two 128×128-size images produces a 128×128-size reconstructed image, containing the smoothed image detail from the initial echelon enhanced by the higher-resolution detail of the residuals from $\text{echelon}_{-2}$. This resultant reconstructed picture 519 may be output or displayed if the required output resolution is that corresponding to $\text{echelon}_{-2}$. In the present example, the reconstructed picture 519 is used for a further cycle. At step 512, the reconstructed image 519 is up-sampled in the same manner as at step 516, so as to produce a 256×256-size predicted picture 524. This is then combined at step 528 with the decoded echelon-1 output 526, thereby producing a 256×256-size reconstructed picture 527 which is an upscaled version of prediction 519 enhanced with the higher-resolution details of residuals 526. At 530 this process is repeated a final time, and the reconstructed picture 527 is upscaled to a resolution of 512×512, for combination with the echelon0 residual at stage 532. Thereby a 512×512 reconstructed picture 531 is obtained.

A further hierarchical coding technology with which the principles of the present invention may be utilised is illustrated in FIGS. 6 and 7. This technology is a flexible, adaptable, highly efficient and computationally inexpensive coding format which combines a different video coding format, a base codec, (e.g., AVC, HEVC, or any other present or future codec) with at least two enhancement levels of coded data.

The general structure of the encoding scheme uses a down-sampled source signal encoded with a base codec, adds a first level of correction data to the decoded output of the base codec to generate a corrected picture, and then adds a further level of enhancement data to an up-sampled version of the corrected picture. Thus, the streams are considered to be a base stream and an enhancement stream, which may be further multiplexed or otherwise combined to generate an encoded data stream. In certain cases, the base stream and the enhancement stream may be transmitted separately. References to an encoded data as described herein may refer to the enhancement stream or a combination of the base stream and the enhancement stream. The base stream may be decoded by a hardware decoder while the enhancement stream is may be suitable for software processing implementation with suitable power consumption. This general encoding structure creates a plurality of degrees of freedom that allow great flexibility and adaptability to many situations, thus making the coding format suitable for many use cases including OTT transmission, live streaming, live ultra-high-definition UHD broadcast, and so on. Although the decoded output of the base codec is not intended for viewing, it is a fully decoded video at a lower resolution, making the output compatible with existing decoders and, where considered suitable, also usable as a lower resolution output.

In certain examples, each or both enhancement streams may be encapsulated into one or more enhancement bitstreams using a set of Network Abstraction Layer Units (NALUs). The NALUs are meant to encapsulate the enhancement bitstream in order to apply the enhancement to the correct base reconstructed frame. The NALU may for example contain a reference index to the NALU containing the base decoder reconstructed frame bitstream to which the enhancement has to be applied. In this way, the enhancement can be synchronised to the base stream and the frames of each bitstream combined to produce the decoded output video (i.e. the residuals of each frame of enhancement level are combined with the frame of the base decoded stream). A group of pictures may represent multiple NALUs.

Returning to the initial process described above, where a base stream is provided along with two levels (or sub-levels) of enhancement within an enhancement stream, an example of a generalised encoding process is depicted in the block diagram of FIG. 6. An input video 600 at an initial resolution is processed to generate various encoded streams 601, 602, 603. A first encoded stream (encoded base stream) is produced by feeding a base codec (e.g., AVC, HEVC, or any other codec) with a down-sampled version of the input video. The encoded base stream may be referred to as the base layer or base level. A second encoded stream (encoded level 1 stream) is produced by processing the residuals obtained by taking the difference between a reconstructed base codec video and the down-sampled version of the input video. A third encoded stream (encoded level 2 stream) is produced by processing the residuals obtained by taking the difference between an up-sampled version of a corrected version of the reconstructed base coded video and the input video. In certain cases, the components of FIG. 6 may provide a general low complexity encoder. In certain cases, the enhancement streams may be generated by encoding processes that form part of the low complexity encoder and the low complexity encoder may be configured to control an independent base encoder and decoder (e.g., as packaged as a base codec). In other cases, the base encoder and decoder may be supplied as part of the low complexity encoder. In one case, the low complexity encoder of FIG. 6 may be seen as a form of wrapper for the base codec, where the functionality of the base codec may be hidden from an entity implementing the low complexity encoder.

A down-sampling operation illustrated by down-sampling component 105 may be applied to the input video to produce a down-sampled video to be encoded by a base encoder 613 of a base codec. The down-sampling can be done either in both vertical and horizontal directions, or alternatively only in the horizontal direction. The base encoder 613 and a base decoder 614 may be implemented by a base codec (e.g., as different functions of a common codec). The base codec, and/or one or more of the base encoder 613 and the base decoder 614 may comprise suitably configured electronic circuitry (e.g., a hardware encoder/decoder) and/or computer program code that is executed by a processor.

Each enhancement stream encoding process may not necessarily include an upsampling step. In FIG. 6 for example, the first enhancement stream is conceptually a correction stream while the second enhancement stream is upsampled to provide a level of enhancement.

Looking at the process of generating the enhancement streams in more detail, to generate the encoded Level 1 stream, the encoded base stream is decoded by the base decoder 614 (i.e. a decoding operation is applied to the encoded base stream to generate a decoded base stream). Decoding may be performed by a decoding function or mode of a base codec. The difference between the decoded base stream and the down-sampled input video is then created at a level 1 comparator 610 (i.e. a subtraction operation is applied to the down-sampled input video and the decoded base stream to generate a first set of residuals). The output of the comparator 610 may be referred to as a first set of residuals, e.g. a surface or frame of residual data, where a residual value is determined for each picture element at the resolution of the base encoder 613, the base decoder 614 and the output of the down-sampling block 605.

The difference is then encoded by a first encoder 615 (i.e. a level 1 encoder) to generate the encoded Level 1 stream 602 (i.e. an encoding operation is applied to the first set of residuals to generate a first enhancement stream).

As noted above, the enhancement stream may comprise a first level of enhancement 602 and a second level of enhancement 603. The first level of enhancement 602 may be considered to be a corrected stream, e.g. a stream that provides a level of correction to the base encoded/decoded video signal at a lower resolution than the input video 600. The second level of enhancement 603 may be considered to be a further level of enhancement that converts the corrected stream to the original input video 600, e.g. that applies a level of enhancement or correction to a signal that is reconstructed from the corrected stream.

In the example of FIG. 6, the second level of enhancement 603 is created by encoding a further set of residuals. The further set of residuals are generated by a level 2 comparator 619. The level 2 comparator 619 determines a difference between an upsampled version of a decoded level 1 stream, e.g. the output of an upsampling component 617, and the input video 600. The input to the up-sampling component 617 is generated by applying a first decoder (i.e. a level 1 decoder) to the output of the first encoder 615. This generates a decoded set of level 1 residuals. These are then combined with the output of the base decoder 614 at summation component 620. This effectively applies the level 1 residuals to the output of the base decoder 614. It allows for losses in the level 1 encoding and decoding process to be corrected by the level 2 residuals. The output of summation component 620 may be seen as a simulated signal that represents an output of applying level 1 processing to the encoded base stream 601 and the encoded level 1 stream 602 at a decoder.

As noted, an upsampled stream is compared to the input video which creates a further set of residuals (i.e. a difference operation is applied to the upsampled re-created stream to generate a further set of residuals). The further set of residuals are then encoded by a second encoder 621 (i.e. a level 2 encoder) as the encoded level 2 enhancement stream (i.e. an encoding operation is then applied to the further set of residuals to generate an encoded further enhancement stream).

Thus, as illustrated in FIG. 6 and described above, the output of the encoding process is a base stream 601 and one or more enhancement streams 602, 603 which preferably comprise a first level of enhancement and a further level of enhancement. The three streams 601, 602 and 603 may be combined, with or without additional information such as control headers, to generate a combined stream for the video encoding framework that represents the input video 600. It should be noted that the components shown in FIG. 6 may operate on blocks or coding units of data, e.g. corresponding to 2×2 or 4×4 portions of a frame at a particular level of resolution. The components operate without any inter-block dependencies, hence they may be applied in parallel to multiple blocks or coding units within a frame. This differs from comparative video encoding schemes wherein there are dependencies between blocks (e.g., either spatial dependencies or temporal dependencies). The dependencies of comparative video encoding schemes limit the level of parallelism and require a much higher complexity.

A corresponding generalised decoding process is depicted in the block diagram of FIG. 7. FIG. 7 may be said to show a low complexity decoder that corresponds to the low complexity encoder of FIG. 6. The low complexity decoder receives the three streams 601, 602, 603 generated by the low complexity encoder together with headers 704 containing further decoding information. The encoded base stream 601 is decoded by a base decoder 710 corresponding to the base codec used in the low complexity encoder. The encoded level 1 stream 602 is received by a first decoder 711 (i.e. a level 1 decoder), which decodes a first set of residuals as encoded by the first encoder 615 of FIG. 1. At a first summation component 712, the output of the base decoder 710 is combined with the decoded residuals obtained from the first decoder 711. The combined video, which may be said to be a level 1 reconstructed video signal, is upsampled by upsampling component 713. The encoded level 2 stream 103 is received by a second decoder 714 (i.e. a level 2 decoder). The second decoder 714 decodes a second set of residuals as encoded by the second encoder 621 of FIG. 1. Although the headers 704 are shown in FIG. 7 as being used by the second decoder 714, they may also be used by the first decoder 711 as well as the base decoder 710. The output of the second decoder 714 is a second set of decoded residuals. These may be at a higher resolution to the first set of residuals and the input to the upsampling component 713. At a second summation component 715, the second set of residuals from the second decoder 714 are combined with the output of the up-sampling component 713, i.e. an upsampled reconstructed level 1 signal, to reconstruct decoded video 750.

As per the low complexity encoder, the low complexity decoder of FIG. 7 may operate in parallel on different blocks or coding units of a given frame of the video signal. Additionally, decoding by two or more of the base decoder 710, the first decoder 711 and the second decoder 714 may be performed in parallel. This is possible as there are no inter-block dependencies.

In the decoding process, the decoder may parse the headers 704 (which may contain global configuration information, picture or frame configuration information, and data block configuration information) and configure the low complexity decoder based on those headers. In order to re-create the input video, the low complexity decoder may decode each of the base stream, the first enhancement stream and the further or second enhancement stream. The frames of the stream may be synchronised and then combined to derive the decoded video 750. The decoded video 750 may be a lossy or lossless reconstruction of the original input video 100 depending on the configuration of the low complexity encoder and decoder. In many cases, the decoded video 750 may be a lossy reconstruction of the original input video 600 where the losses have a reduced or minimal effect on the perception of the decoded video 750.

In each of FIGS. 6 and 7, the level 2 and level 1 encoding operations may include the steps of transformation, quantization and entropy encoding (e.g., in that order). These steps may be implemented in a similar manner to the operations shown in FIGS. 4 and 5. The encoding operations may also include residual ranking, weighting and filtering. Similarly, at the decoding stage, the residuals may be passed through an entropy decoder, a de-quantizer and an inverse transform module (e.g., in that order). Any suitable encoding and corresponding decoding operation may be used. Preferably however, the level 2 and level 1 encoding steps may be performed in software (e.g., as executed by one or more central or graphical processing units in an encoding device).

The transform as described herein may use a directional decomposition transform such as a Hadamard-based transform. Both may comprise a small kernel or matrix that is applied to flattened coding units of residuals (i.e. 2×2 or 4×4 blocks of residuals). More details on the transform can be found for example in patent applications WO/2013/171173 or WO/2018/046941, which are incorporated herein by reference. The encoder may select between different transforms to be used, for example between a size of kernel to be applied.

The transform may transform the residual information to four surfaces. For example, the transform may produce the following components or transformed coefficients: average, vertical, horizontal and diagonal. A particular surface may comprise all the values for a particular component, e.g. a first surface may comprise all the average values, a second all the vertical values and so on. As alluded to earlier in this disclosure, these components that are output by the transform may be taken in such embodiments as the coefficients to be quantized in accordance with the described methods. A quantization scheme may be useful to create the residual signals into quanta, so that certain variables can assume only certain discrete magnitudes. Entropy encoding in this example may comprise run length encoding (RLE), then processing the encoded output is processed using a Huffman encoder. In certain cases, only one of these schemes may be used when entropy encoding is desirable.

In summary, the methods and apparatuses of FIGS. 1 to 7 are based on an overall approach which is built over an existing encoding and/or decoding algorithm (such as MPEG standards such as AVC/H.264, HEVC/H.265, etc. as well as non-standard algorithm such as VP9, AV1, and others) which works as a baseline for an enhancement layer which works accordingly to a different encoding and/or decoding approach. The idea behind the overall approach of the examples is to hierarchically encode/decode the video frame as opposed to the use block-based approaches as used in the MPEG family of algorithms. Hierarchically encoding a frame includes generating residuals for the full frame, and then a decimated frame and so on.

As indicated above, the processes may be applied in parallel to coding units or blocks of a colour component of a frame as there are no inter-block dependencies. The encoding of each colour component within a set of colour components may also be performed in parallel (e.g., such that the operations are duplicated according to (number of frames)*(number of colour components)*(number of coding units per frame)). It should also be noted that different colour components may have a different number of coding units per frame, e.g. a luma (e.g., Y) component may be processed at a higher resolution than a set of chroma (e.g., U or V) components as human vision may detect lightness changes more than colour changes.

Thus, as illustrated and described above, the output of the decoding process is an (optional) base reconstruction, and an original signal reconstruction at a higher level. This example is particularly well-suited to creating encoded and decoded video at different frame resolutions. For example, the input signal 30 may be an HD video signal comprising frames at 1920×1080 resolution. In certain cases, the base reconstruction and the level 2 reconstruction may both be used by a display device. For example, in cases of network traffic, the level 2 stream may be disrupted more than the level 1 and base streams (as it may contain up to 4× the amount of data where down-sampling reduces the dimensionality in each direction by 2). In this case, when traffic occurs the display device may revert to displaying the base reconstruction while the level 2 stream is disrupted (e.g., while a level 2 reconstruction is unavailable), and then return to displaying the level 2 reconstruction when network conditions improve. A similar approach may be applied when a decoding device suffers from resource constraints, e.g. a set-top box performing a systems update may have an operation base decoder 220 to output the base reconstruction but may not have processing capacity to compute the level 2 reconstruction.

The encoding arrangement also enables video distributors to distribute video to a set of heterogeneous devices; those with just a base decoder 720 view the base reconstruction, whereas those with the enhancement level may view a higher-quality level 2 reconstruction. In comparative cases, two full video streams at separate resolutions were required to service both sets of devices. As the level 2 and level 1 enhancement streams encode residual data, the level 2 and level 1 enhancement streams may be more efficiently encoded, e.g. distributions of residual data typically have much of their mass around 0 (i.e. where there is no difference) and typically take on a small range of values about 0. This may be particularly the case following quantization. In contrast, full video streams at different resolutions will have different distributions with a non-zero mean or median that require a higher bit rate for transmission to the decoder.

In the examples of FIGS. 1 to 7 described herein residuals are encoded by an encoding pipeline. This may include transformation, quantization and entropy encoding operations. It may also include residual ranking, weighting and filtering. Residuals are then transmitted to a decoder, e.g. as L-1 and L-2 enhancement streams, which may be combined with a base stream as a hybrid stream (or transmitted separately). In one case, a bit rate is set for a hybrid data stream that comprises the base stream and both enhancements streams, and then different adaptive bit rates are applied to the individual streams based on the data being processed to meet the set bit rate (e.g., high-quality video that is perceived with low levels of artefacts may be constructed by adaptively assigning a bit rate to different individual streams, even at a frame by frame level, such that constrained data may be used by the most perceptually influential individual streams, which may change as the image data changes).

The sets of residuals as described herein may be seen as sparse data, e.g. in many cases there is no difference for a given pixel or area and the resultant residual value is zero.

When looking at the distribution of residuals much of the probability mass is allocated to small residual values located near zero—e.g. for certain videos values of −2, −1, 0, 1, 2 etc. occur the most frequently. In certain cases, the distribution of residual values is symmetric or near symmetric about 0. In certain test video cases, the distribution of residual values was found to take a shape similar to logarithmic or exponential distributions (e.g., symmetrically or near symmetrically) about 0. The exact distribution of residual values may depend on the content of the input video stream.

Residuals may be treated as a two-dimensional image in themselves, e.g. a delta image of differences. Seen in this manner the sparsity of the data may be seen to relate features like “dots”, small “lines”, “edges”, “corners”, etc. that are visible in the residual images. It has been found that these features are typically not fully correlated (e.g., in space and/or in time). They have characteristics that differ from the characteristics of the image data they are derived from (e.g., pixel characteristics of the original video signal).

As the characteristics of residuals differ from the characteristics of the image data they are derived from it is generally not possible to apply standard encoding approaches, e.g. such as those found in traditional Moving Picture Experts Group (MPEG) encoding and decoding standards. For example, many comparative schemes use large transforms (e.g., transforms of large areas of pixels in a normal video frame). Due to the characteristics of residuals, e.g. as described above, it would be very inefficient to use these comparative large transforms on residual images. For example, it would be very hard to encode a small dot in a residual image using a large block designed for an area of a normal image.

Certain examples described herein address these issues by instead using small and simple transform kernels (e.g., 2×2 or 4×4 kernels—the Directional Decomposition and the Directional Decomposition Squared—as presented herein). The transform described herein may be applied using a Hadamard matrix (e.g., a 4×4 matrix for a flattened 2×2 coding block or a 16×16 matrix for a flattened 4×4 coding block). This moves in a different direction from comparative video encoding approaches. Applying these new approaches to blocks of residuals generates compression efficiency. For example, certain transforms generate uncorrelated transformed coefficients (e.g., in space) that may be efficiently compressed. While correlations between transformed coefficients may be exploited, e.g. for lines in residual images, these can lead to encoding complexity, which is difficult to implement on legacy and low-resource devices, and often generates other complex artefacts that need to be corrected. Pre-processing residuals by setting certain residual values to 0 (i.e. not forwarding these for processing) may provide a controllable and flexible way to manage bitrates and stream bandwidths, as well as resource use.

Examples Relating to Reducing Banding Artefacts

In the examples described below, a processing technique is used to reduce banding artefacts which occur as results of a reduction in bit depth of a digital image. Introducing a dithering operation before an encoding operation has been found experimentally to result in an encoded signal that can be reconstructed by a decoder to produce a digital image with an enhanced perceived quality. The dithering operation in this disclosure introduces controlled adjustments to a digital image selectively by using a mask and an adjustment rule that dictates what sort of adjustment should be applied.

There is disclosed a method of introducing dither to reduce banding artefacts in a digital image, wherein the banding artefacts result from a pixel bit depth reduction prior to encoding of the digital image. The method comprises applying a mask to the digital image prior to encoding at the reduced bit depth. The mask indicates a pattern for selective adjustment of the pixel values in the reduced bit depth version of the digital image. The method comprises for each pixel in the digital image: determining the pixel’s location in the mask and if the mask pattern indicates selective adjustment then determining a pixel adjustment factor from the pixel information lost during the pixel depth reduction and applying the pixel adjustment factor to the reduced bit depth version of the pixel.

At a general level, the mask pattern indicates no selective adjustment for at least one pixel and indicates applying selective adjustment to at least one pixel in five in the horizontal direction, and at least one pixel in five in the vertical direction of the digital image.

In this way, a reduced bit depth version of the digital image can be produced with enhanced perceived quality by selectively (from the mask), changing pixels using discarded information which had previously provided subtle changes in colour and/or luminance. Any banding artefacts in the digital image will be mitigated in the reduced bit depth version of the digital image. In addition, applying selective changes using the mask and the discarded information, for example instead of processing the image to uncover areas and locations of possible banding artefacts for specific remedy, reduces the processing power necessary and increases the speed of processing the digital image.

Benefits arise from performing the method at an encoder prior to encoding because if the method was performed at a decoder then the decoder would have to know the pixel information that has been discarded, and so, in effect, the original signal would need to be sent from this additional signalling.

Additionally, and in the context of hierarchical coding systems such as LCEVC and VC-6, encoding the adjusted reduced bit depth version of the digital image will reduce banding artefacts at higher echelons. This is because at higher echelons the residual data may be encoded with losses, and minor adjustments to pixels, for example to deal with a corresponding increase in the bit depth at a decoder, would not be retained in the residual data when the residual data is encoded. This would be especially pronounced for complex digital images and for digital images with sharp transitions, and in situations where there is limited bandwidth relative to the desired signal size.

The above method can usefully be applied, but not necessarily so, to the examples described above as part of the downsampling operation, e.g. one or more of operations 201 in FIGS. 2 and 3 or 605 in FIG. 6 (as well as other downsampling operations that are not shown).

Figure 8:
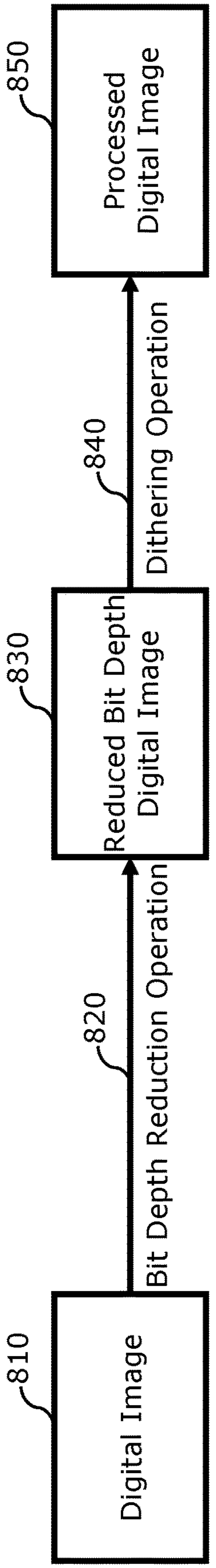
FIG. 8 is a block diagram showing processing of a digital image.

FIG. 8 is a block diagram showing the steps of processing a digital image prior to encoding in accordance with the method explained above. FIG. 8 shows a digital image 810 as the input, which undergoes a reduction in bit depth operation 820 for reducing the bit depth of the digital image to produce a reduced bit depth version of the digital image 830. The reduced bit depth version of the digital image 830 undergoes a dithering operation 840 as described in the method above to produce a processed digital image 850. Several specific dithering operations are described with reference to FIGS. 9 to 15.

The dithering operation may occur before the bit depth reduction, during the bit depth reduction or after the bit depth reduction. The dithering operation needs to know what the bit depth reduction operation 820 will do or has done to the digital image because the dithering operation uses the discarded information from the digital image 810 for selective adjustment of the reduced bit depth version.

Pixel values refer to the luminance and/or chrominance information for each pixel. The bit depth discussed herein refers to the number of bits used to indicate the luminance value or chrominance value.

The bit depth reduction operation 820 reduces the bit depth of the digital image from a first bit depth to a second bit depth. In this example, the difference between the first bit depth and the second bit depth is 2 bits and the first bit depth is 10 bits. However, in principle the difference between the first bit depth and the second bit depth may be any number of bits. The first bit depth may be 10, 12 or 14 bits and the second bit depth may be 8, 10 or 12 bits.

Figure 9:
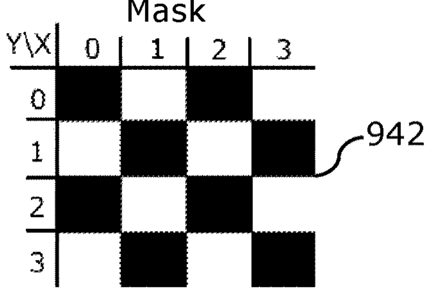
FIG. 9 is a flow diagram showing the processing of a digital image according to the process of FIG. 8 using a checkerboard pattern mask with a positive adjustment.

FIG. 9 is a flow diagram showing the processing of a digital image according to the process of FIG. 8 using a checkerboard pattern mask with a positive adjustment. In this example, the process starts with the digital image 810 of FIG. 8 being a 10-bit digital image. The bit depth reduction operation 820 of FIG. 8 reduces the 10-bit digital image 810 into an 8-bit digital image 830. The dithering operation 840 applies a mask 942 and an adjustment rule 944 to the 8-bit digital image 830 to produce an adjusted reduced bit depth version of the digital image 850 of FIG. 8.

The digital images 810, 830 and 850 are shown to have 16 pixels but a digital image with any number of pixels may be used. The dithering operation is applied to the whole digital image. Alternatively, the dithering operation disclosed herein may only apply to a portion of a digital image, thus not all the pixels of the digital image may be considered for adjustment.

The location of pixels in FIGS. 9 to 14 are outlined using co-ordinates (x,y). For example, pixel (1,2) of the 10-bit digital image 810 has a pixel value of 0010100001 and pixel (3,0) of the 10-bit digital image 810 has a pixel value of 0010100011.

A bit number is the position of a bit in a pixel value when the pixel value is represented as a binary number. For example, for pixel (0,0) with a value of 0010100011, bit number 0=1, bit number 1=1, bit number 2=0, bit number 3=0, bit number 4=0, bit number 5=1, bit number 6=0, bit number 7=1, bit number 8=0 and bit number 9=0.

Throughout this disclosure the bit number is in the context of a 10-bit word so that a comparison of the pixel data of the 10-bit image with the 8-bit image after the bit depth reduction step is straightforward to describe. For example, the lowest significant bit in pixel (1,2) of the 10-bit digital image 810 is bit number 0 which equals 1, whereas the lowest significant bit in pixel (1,2) of the 8-bit digital image 830 is bit number 2 which equals 0 because bits number 0 and 1 of the 10-bit digital image 810 have been discarded during the bit depth reduction operation. Similarly, the lowest significant bit in pixel (1,2) of the adjusted reduced bit depth version of the digital image 850 is bit number 2 which equals 0 because bits number 0 and 1 of the 10-bit digital image 810 have been discarded during the down scaling operation.

In FIG. 9, the 10-bit digital image 810 is reduced to an 8-bit digital image by discarding bits 0 and 1 of the 10-bit digital image 810. For example, pixel (1,1) of the 10-bit digital image 810 has a value of 0010100011, after the bit depth reduction to produce the 8-bit digital image, the pixel value is 00101000. Hence bits 0 and 1 equaling 11 have been discarded leading to a loss of pixel information.

As can be seen on FIG. 9, the 10-bit digital image 810 has pixels with subtly different values scattered adjacent one another throughout the digital image. The subtle differences in pixel values in the 10-bit digital image is due to the differences in the values of pixel information bits 0 and 1. However, after the bit depth reduction operation, bits 0 and 1 are lost and now multiple adjacent pixels have the same pixel value in the 8-bit digital image which reduces the perceived quality of the image due to banding artefacts.

The mask 942 and adjustment rule 944 are applied to breakup these banding artefacts and introduce some variety in the pixel values of the reduced bit depth version of the digital image.

The mask 942 is in the form of a checkerboard pattern with squares corresponding to pixels, with a black square corresponding to a pixel location at positions (0,0) and (1,1) of the mask, and a white square at each of positions (0,1) and (1,0). The mask repeats across the digital image. For convenience of understanding, a black square indicates that a selective adjustment of a pixel corresponding to that square is to be made. A white square indicates no selective adjustment of the pixel in that specific position in the digital image. For example, when the mask 942 is applied to the digital image, and a black square in the mask corresponds to pixel (2,2) this indicates selective adjustment of pixel (2,2) of the 8-bit digital image. The white square in the mask corresponding to pixel (1,0) indicates no selective adjustment of pixel (1,0) of the 8-bit digital image.

The adjustment rule 944 indicates a possible adjustment to be made when the mask indicates selective adjustment for a pixel. The adjustment rule uses the bits discarded during the bit depth reduction operation in determining the possible adjustment. In the adjustment rule 944, an adjustment is made if bit number 1 lost during the bit depth reduction operation is of value 1 (and not 0). The adjustment rule adds a value of 1 to the pixel information of the 8-bit bit version of the pixel information (or in other words adds 1 to bit number 2—using our convenient 10-bit numbering convention).

In this example, when the adjustment rule 944 indicates an adjustment, the adjustment is a positive adjustment as it indicates increasing the pixel value of the adjusted pixels. Other examples show negative or other adjustments.

By applying the mask 942 and the adjustment rule 944, a selectively adjusted reduced bit depth version of the digital image 850 is produced. As can be seen in FIG. 9, subtly different pixel values are scattered adjacent one another throughout the adjusted reduced bit depth version of the digital image 850. There is more variety in the pixel value in the adjusted reduced bit depth version of the digital image 850 than the 8-bit digital image 830. Due to the use of the mask 942 and the adjustment rule 944, the reduced bit depth version of the digital image has a higher perceived image quality than without applying the mask 942 and the adjustment rule 944. Naturally, encoding the adjusted reduced bit depth version of the digital image 850 will enable a decoder to create improved reconstruction of digital images with reduced banding artefacts when compared with encoding the unadjusted version.

Although in this example a checkerboard pattern mask is used, it is also useful to use other types of patterns. The pattern does not have to be a repeatable pattern so long as the pattern indicates no selective adjustment for at least one pixel and indicates applying selective adjustment to at least one pixel in five in the horizontal direction, and at least one pixel in five in the vertical direction of the digital image, or more.

Adjustment rule 944 is a particular example of an adjustment rule and different adjustment rules may be applied. It may be useful to change the pixel values if bit number 1 of the pixel information lost is 0 instead of 1. It may also be useful to change the pixel values by adding any value, for example, adding −2, −1, 0, 1 or 2. The bigger the change in pixel values the more gradient there is between different pixel which may reduce the perceived effect of banding.

The change indicated by the adjustment rule is defined as the pixel adjustment factor.

In this example, the pixel adjustment factor is determined based on the value of the most significant bit of the pixel information lost during the bit depth reduction. Alternatively, the pixel adjustment factor may be determined based on a value of any single bit of the pixel information lost during the bit depth reduction regardless of the significance. Alternatively, the pixel adjustment factor is determined based on the value of each bit lost during the bit depth reduction.

In some examples, the influence of each bit lost during the bit depth reduction on the pixel adjustment factor is dependent on the significance of said bit. For example, a more significant bit may have a greater influence than a lower significant bit.

The following examples of FIGS. 10 to 14 teach different examples of masks and adjustment rules that may be used instead of the example of FIG. 9.

Figure 10:
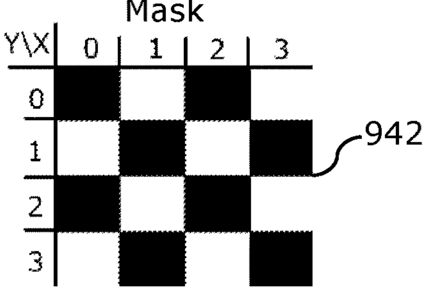
FIG. 10 is a flow diagram showing the processing of a digital image according to the process of FIG. 8 using a checkerboard pattern mask with a negative adjustment.

FIG. 10 is a flow diagram showing the processing of a digital image according to the process of FIG. 8 using a checkerboard pattern mask with a negative adjustment. FIG. 10 only differs from FIG. 9 by having a different adjustment rule 1044 which incorporates a negative adjustment. A negative adjustment is an adjustment that indicates decreasing the pixel value of the adjusted pixels.

In the example of FIG. 10, the adjustment rule 1044 indicates applying a negative adjustment to the pixels when the mask indicates selective adjustment and bit number 1 of the pixel information lost during the reduction in bit depth operation is 0. The different adjustment rule used in FIG. 10 produces a different adjusted reduced bit depth version of the digital image than the adjustment rule of FIG. 9.

Figure 11:
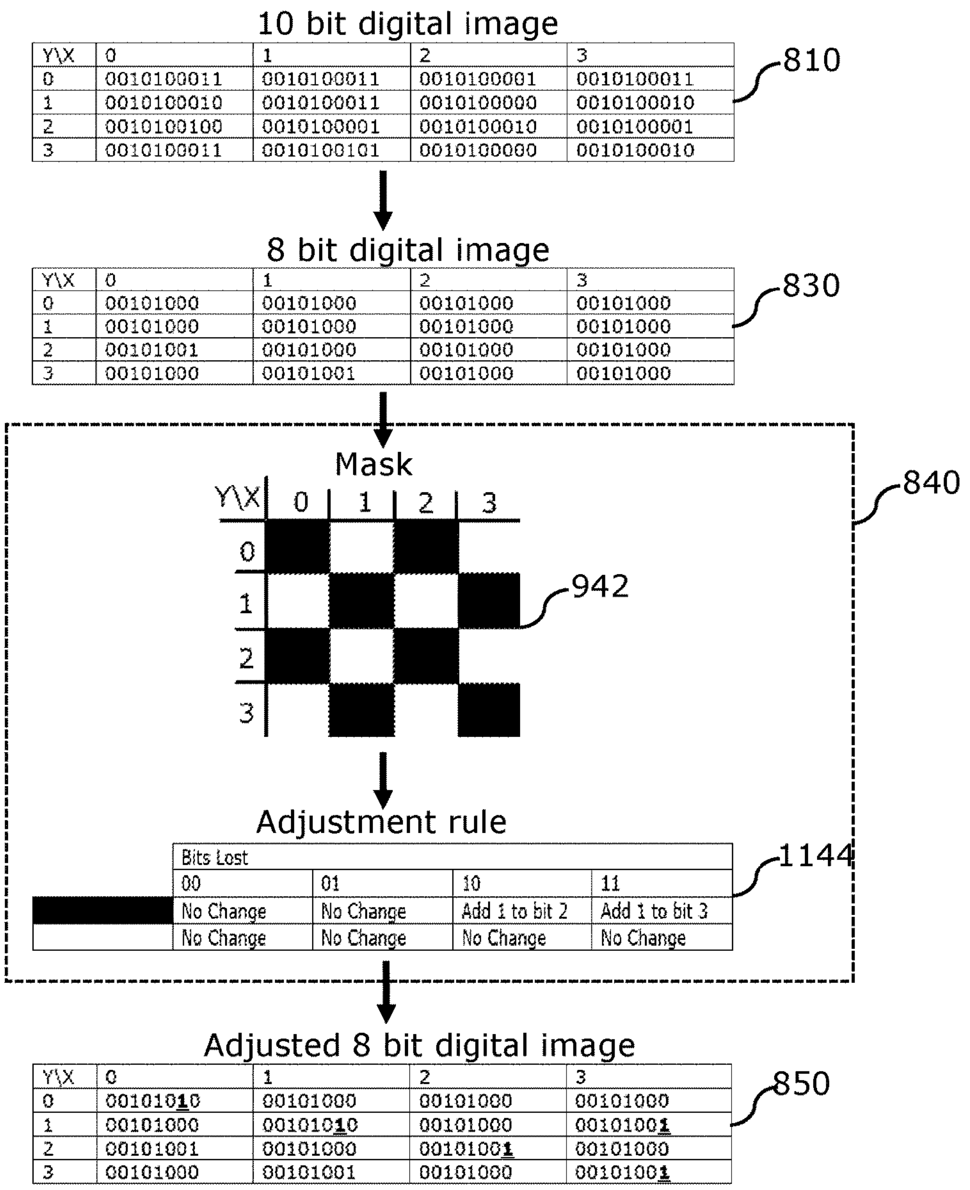
FIG. 11 is a flow diagram showing the processing of a digital image according to the process of FIG. 8 using a checkerboard pattern mask with variable adjustment.

FIG. 11 is a flow diagram showing the processing of a digital image according to the process of FIG. 8 using a checkerboard pattern mask with variable adjustment. FIG. 11 only differs from FIGS. 9 and 10 by having a different adjustment rule 1144 which incorporates a variable adjustment. A variable adjustment is an adjustment that indicates adjusting the pixels by a different adjustment factor depending on the pixel information lost during the bit depth reduction.

In the example of FIG. 11, the adjustment rule 1144 indicates not changing any pixel when the mask indicates no selective adjustment. The adjustment rule 1144 indicates changing a pixel value when the mask indicates selective adjustment and bit number 1 lost during the bit depth reduction is of a value 1. In addition, the adjustment rule indicates adding 1 (i.e. adding 1 to bit number 2) of the 8-bit digital image 830 if the pixel information lost has a value of 10 and adding 2 (i.e. adding 1 to bit number 3) of the 8-bit digital image 830 if the pixel information lost has a value of 11.

The different adjustment rule used in FIG. 11 produces a different adjusted reduced bit depth version of the digital image than the adjustment rules of FIGS. 9 and 10 with a bigger range of pixel values representing a larger luminance value or chrominance value range.

Figure 12:
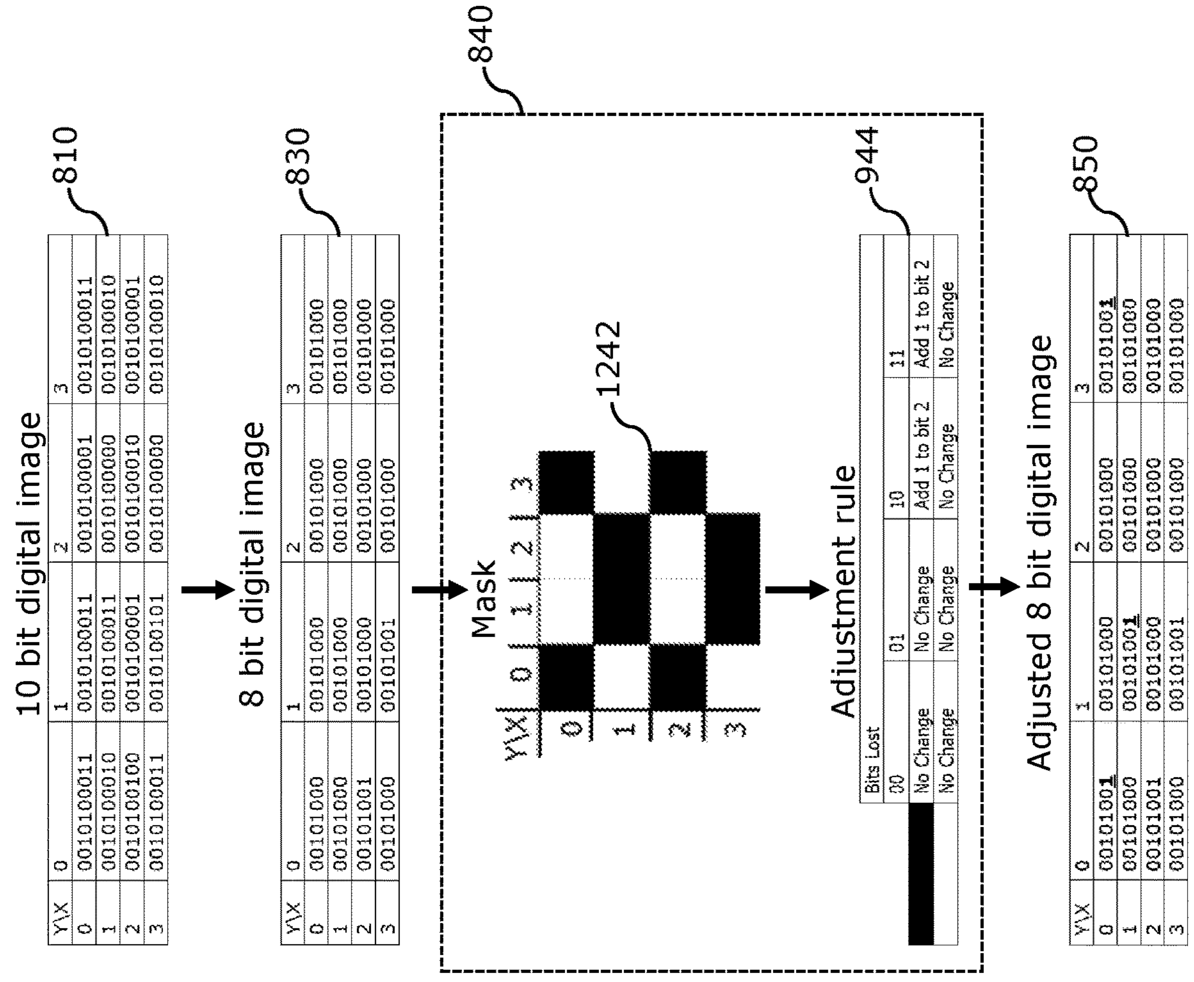
FIG. 12 is a flow diagram showing the processing of a digital image according to the process of FIG. 8 using a checkerboard pattern mask and the inverse of said pattern.

FIG. 12 is a flow diagram showing the processing of a digital image according to the process of FIG. 8 using a checkerboard pattern mask and the inverse of said pattern.

The example of FIG. 12 differs from FIG. 9 by using a different mask which includes the checkerboard pattern of FIG. 9 for a portion of the mask 1242 and the inverse of the checkerboard pattern of FIG. 9 for a second, different portion of the mask 1242.

Although the same adjustment rule 944 from FIG. 9 is used in FIG. 12, due to the different mask 1242 used in FIG. 12, FIG. 12 produces a differently adjusted reduced bit depth version of the digital image than the adjustment rule of FIG. 9.

As can be seen from this example and the other examples, the mask pattern can be small in comparison to the digital image, and can be repeated to cover the whole digital image. The repetition can either be of the same mask pattern, or a different mask pattern, such as the use of alternating mask patterns, for example the alternating inverse mask pattern as shown in FIG. 12.

Figure 13:
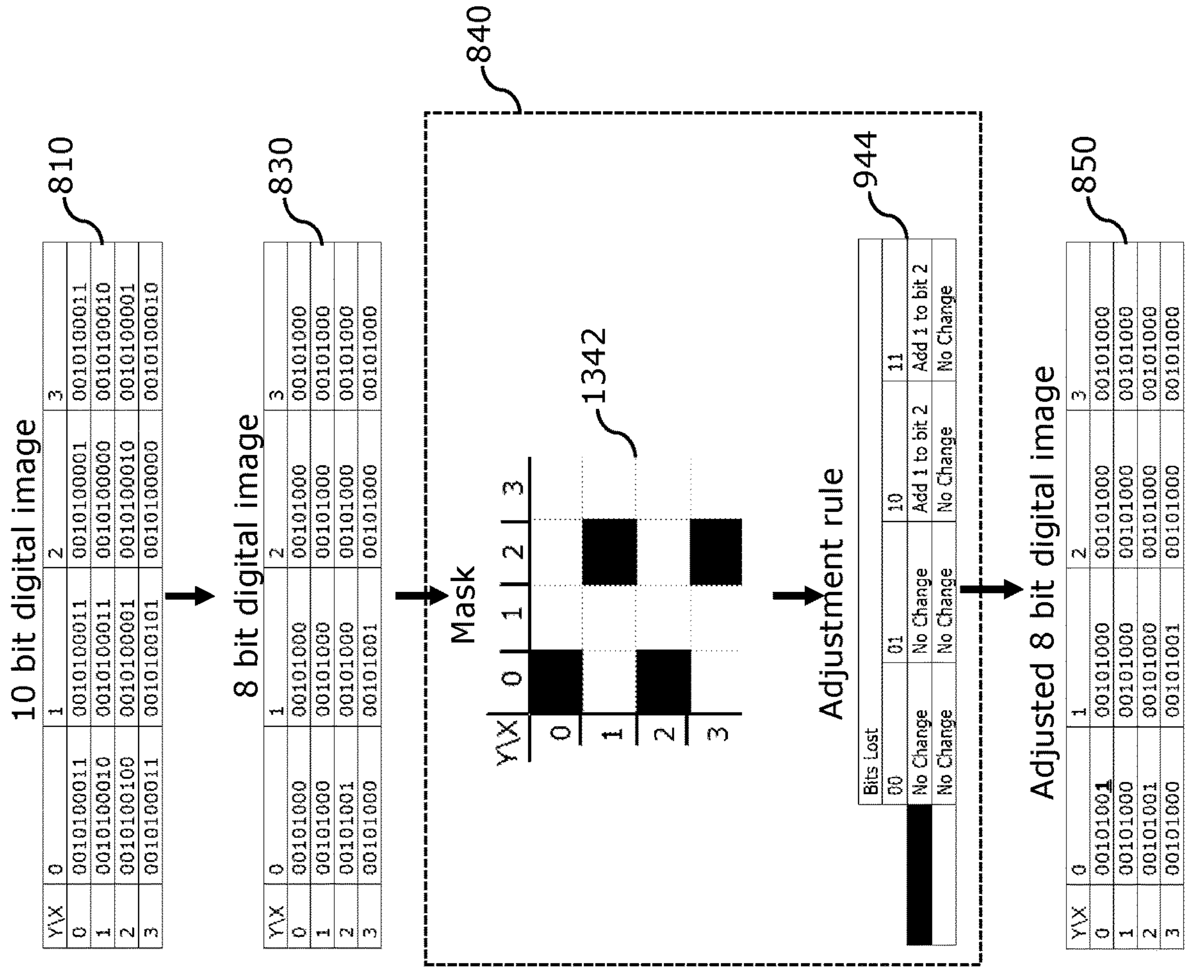
FIG. 13 is a flow diagram showing the processing of a digital image according to the process of FIG. 8 using a less frequent adjustment pattern.

FIG. 13 is a flow diagram showing the processing of a digital image according to the process of FIG. 8 using an infrequent adjustment pattern. The example of FIG. 13 differs from FIG. 9 by using a different mask which includes a pattern that indicates less frequent selective adjustment than that of FIG. 9. Only two black "adjustment" squares appear in the pattern for every 8 pixels, and the mask pattern is 4×2 pixels in size, repeating. Other "adjustment" densities may be used, such as 3 selective adjustments per 8 pixels.

Due to the different mask 1342, FIG. 13 produces a differently adjusted reduced bit depth version of the digital image than the process of FIG. 9.

Figure 14:
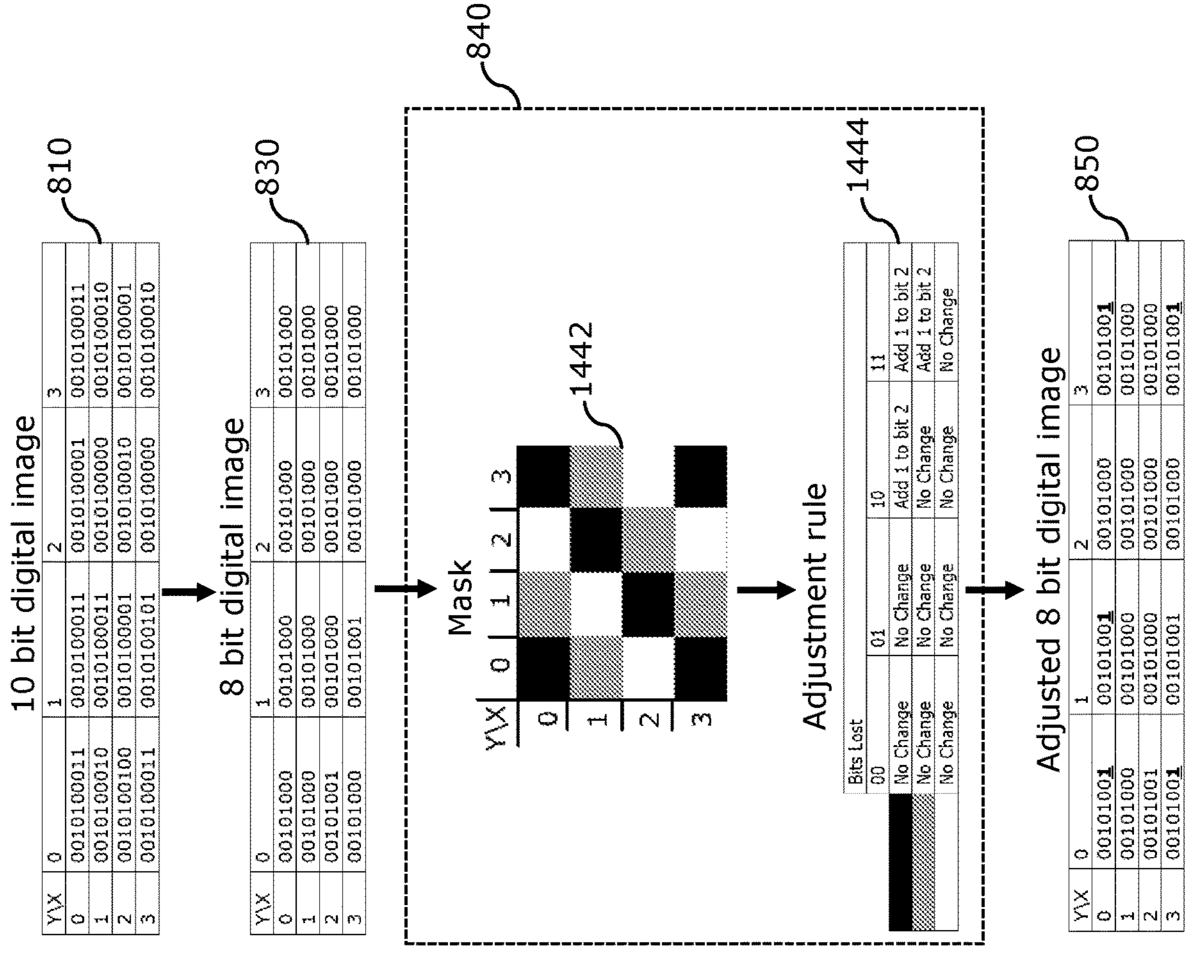
FIG. 14 is a flow diagram showing the processing of a digital image according to the process of FIG. 8 using a pattern mask that indicates variable selective adjustment.

FIG. 14 is a flow diagram showing the processing of a digital image according to the process of FIG. 8 using a mask pattern that indicates variable selective adjustment. The example of FIG. 14 differs from FIG. 9 by using a different mask 1442 indicating three levels of adjustment, namely zero adjustment, adjustment level 1 and adjustment level 2 together with a different adjustment rule 1444 based on those adjustment levels.

The mask 1442 includes a black and grey square which each indicate selective adjustment at different levels and a white a square which indicates no selective adjustment.

In the example of FIG. 14, the adjustment rule 1444 is the same as the adjustment rule 944 of FIG. 9 with regard to the black squares and the white squares. In other words, the adjustment rule 1444 indicates no change to any pixel located in a location where the mask indicates no selective adjustment using the white square, whereas any pixel located in a location where the mask indicates selective adjustment using the black square and bit number 1 lost during the bit depth reduction is of a value 1 is to be changed by adding 1 (i.e. adding 1 to bit number 2) of the 8-bit digital image. In addition, any pixel located in a location where the mask indicates selective adjustment using the grey square and bit numbers 0 and 1 lost during the bit depth reduction are both of a value of 1 is to be changed by adding a value of 1 (i.e. adding 1 to bit number 2) of the 8-bit digital image.

Due to the different mask 1442 and adjustment rule 1444, FIG. 14 produces a different adjusted reduced bit depth version of the digital image than the adjustment rule of FIG. 9. The grey "adjustment" square will change fewer pixels that the black "adjustment" square, providing two selective adjustment levels in addition to the no selective adjustment indicated by the white square in the mask pattern.

Figure 15:
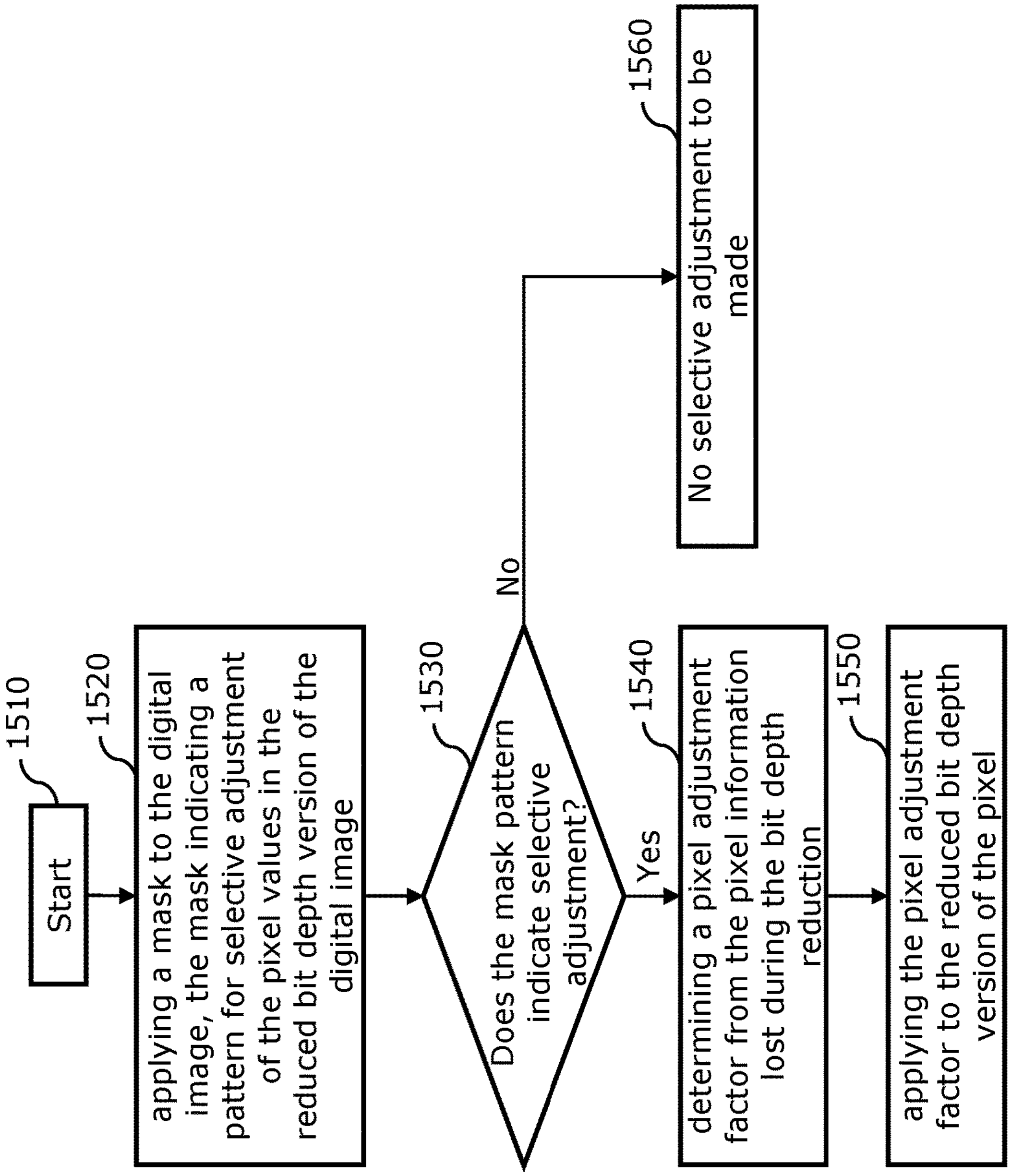
FIG. 15 is a flow diagram showing of a method of applying dithering to a reduced bit depth version of a digital image.

FIG. 15 is a flow diagram showing of a method of applying dithering to a reduced bit depth version of a digital image. The method starts step 1510. At step 1520, the method comprises applying a mask to the digital image, the mask indicating a pattern for selective adjustment of the pixel values in the resulting reduced bit depth version of the digital image. At step 1530, the method determines whether the mask pattern indicates selective adjustment. If the mask pattern indicates selective adjustment, then the method progresses to step 1540. At step 1540 the method comprises determining a pixel adjustment factor from the pixel information lost during the bit depth reduction. At step 1550 the method comprises applying the pixel adjustment factor to the reduced bit depth version of the pixel. If at step 1530, the method determines that the mask pattern does not indicate selective adjustment then the method progresses to step 1560 where no selective adjustment is to be made.

In certain examples, the dithering operation and bit depth reduction operation may be provided in a single package in any hierarchical tier-based codec.

The method includes the variations described generally and in detail in FIGS. 8-14.

The method is performed as part of a hierarchical coding scheme, such as those described with reference to FIGS. 1-7, and which is described in more detail with reference to FIG. 16 (LCEVC example). As such, the method comprises encoding, at a set of encoders, signals derived from the digital image and the reduced bit depth version of the digital image. In principle, the method may compare two versions of the digital image at the encoder to generate a residual stream, where one of the versions has been processed. In this example, the processing is reducing the bit depth. The comparison is made between a restored version of the digital image and the corresponding version which has not had that processing applied. The restoration and comparison to produce the residual stream would allow a decoder to use the residual stream to correct the decoder restored version. In some examples, two residual streams would be created, following two comparisons.

The encoding at the set of encoders comprises encoding a signal derived from the digital image using a first encoding method and a single derived from the reduced bit depth version of the digital image using a second encoding method, wherein the first encoding method and the second encoding method are different and output part of an LCEVC encoded signal.

The encoding at the set of encoders comprises encoding a signal derived from the digital image using a first encoding method and a single derived from the reduced bit depth version of the digital image using a second encoding method, wherein the first encoding method and the second encoding method are the same and wherein the first encoding method and the second encoding method generate at least part of a VC-6 encoded signal. While the examples of FIGS. 1-7 describe video coding, suitable modifications can be made to encode non-video digital images as necessary, and the digital images of the examples of FIGS. 8-15 can be frames, or blocks within a frame, of digital video.

Figure 16:
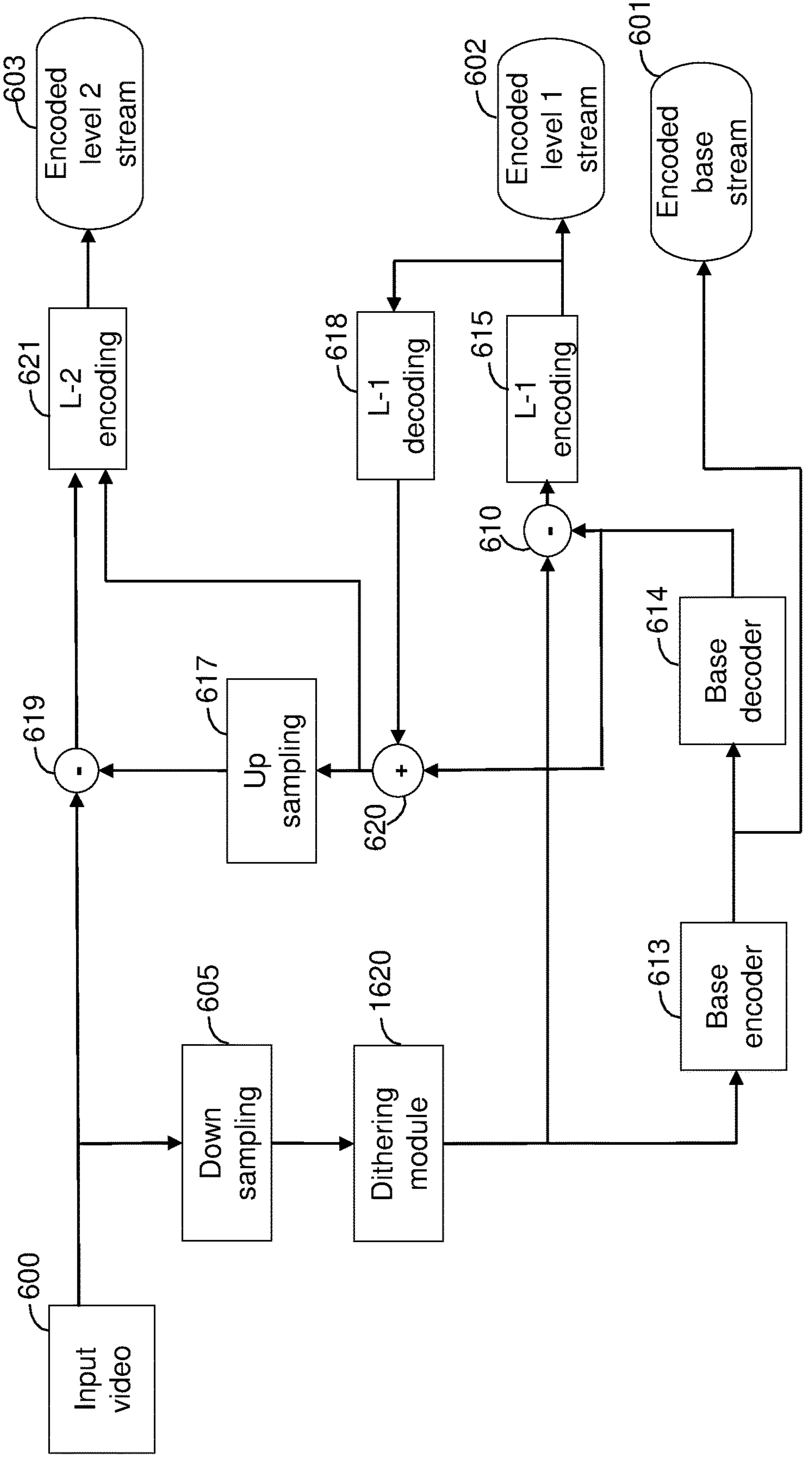
FIG. 16 shows in a high-level schematic the processing demonstrated in FIG. 8 and implemented in the encoding process of FIG. 6.

FIG. 16 shows in a high-level schematic the processing discussed with reference to FIGS. 8 to 15. This example shows the general teaching of FIGS. 8 to 15 implemented in the specific LCEVC encoding embodiment of FIG. 6. In this exemplary embodiment, the details of FIG. 6 are not repeated and like reference numerals describe like components and arrangements. As can be seen in FIG. 16, the input video 600, comprising a series of digital images or frames, is passed to the down sampling stage 605 which in this example reduces the input signal from a high bit depth to a lower bit depth, at least, as described with reference to FIGS. 8 to 15. A resolution change or other change may also take place as described with reference to FIG. 6. The input video 600 then undergoes a dithering operation at dithering module 1620. The dithering operation is configured as described above with reference to FIGS. 8 to 15.

Each adjusted reduced bit depth digital image in the video signal is sent to comparator 610 for processing in accordance with the description of FIG. 6. Additionally, each adjusted reduced bit depth digital image in the video signal is encoded at the base encoder 613 and further processed in accordance with the description of FIG. 6.

The overall encoding in FIG. 16 comprises encoding a signal derived from the input video at the original bit depth using a first encoding method and a single derived from the input video stream at the adjusted reduced bit depth using a second method. The first encoding method and the second encoding method are different in the LCEVC embodiment shown in FIG. 16 and described in detail in FIG. 6. When different, the first and second encoding methods may generate at least part of an LCEVC encoded data stream.

Alternatively, the first encoding method and the second encoding method may be the same in a VC-6 embodiment also incorporating bit depth reduction and dithering as described at each level of quality change as needed and typically as the lowest level of quality at least (such as that described with reference to FIGS. 2 and 3). In that case, the first encoding method and the second encoding method may generate at least part of a VC-6 encoded data stream.

Example Apparatus for Implementing the Encoder

Figure 17:
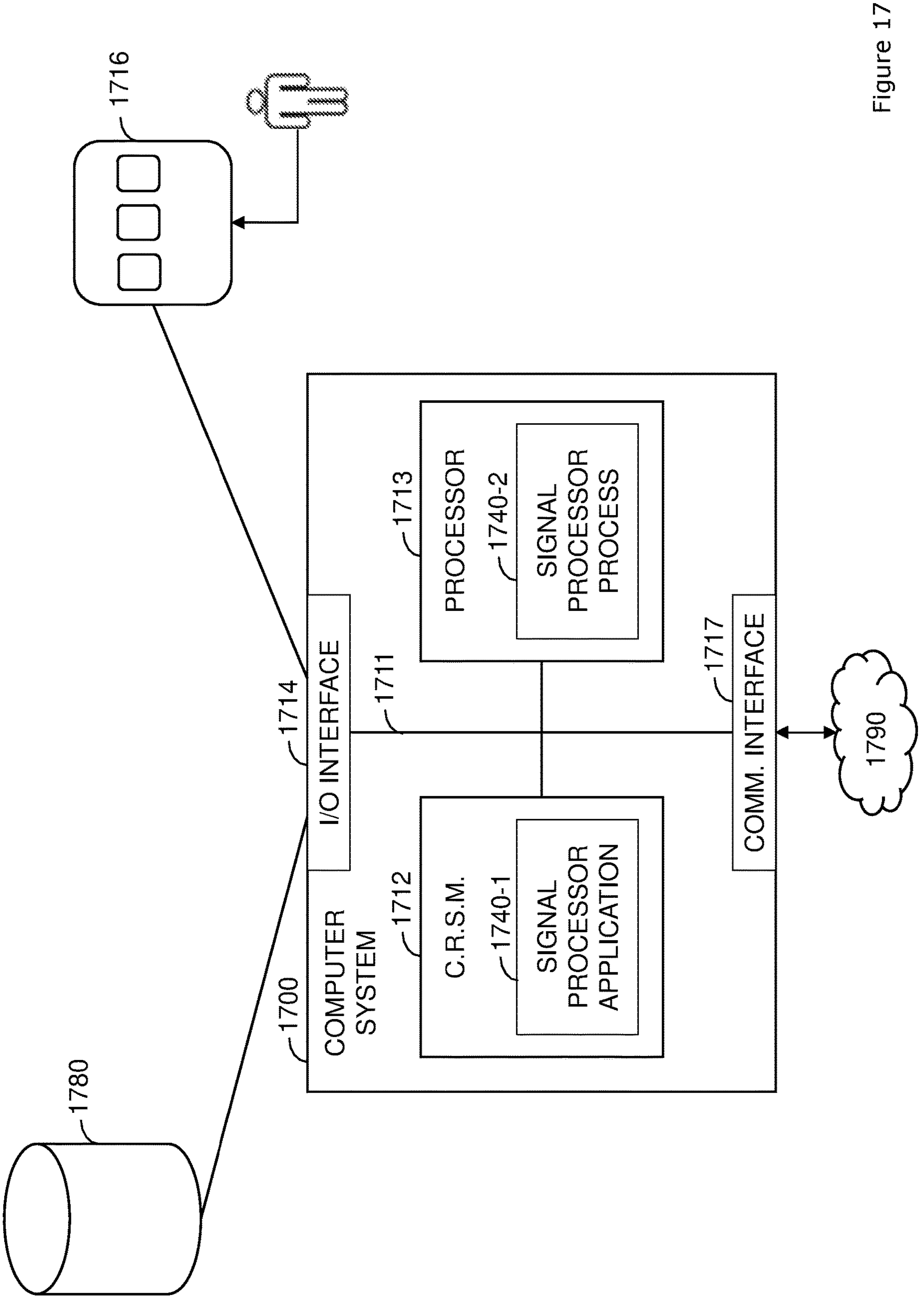
FIG. 17 shows a block diagram of an example of an apparatus in accordance with embodiments.

Referring to FIG. 17, there is shown a schematic block diagram of an example of an apparatus 1700.

Examples of the apparatus 1700 include, but are not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, mobile device, video game console, handheld video game device, a peripheral device such as a switch, modem, router, a vehicle etc., or in general any type of computing or electronic device.

In this example, the apparatus 1700 comprises one or more processors 1713 configured to process information and/or instructions. The one or more processors 1713 may comprise a central processing unit (CPU). The one or more processors 1713 are coupled with a bus 1711. Operations performed by the one or more processors 1713 may be carried out by hardware and/or software. The one or more processors 1713 may comprise multiple co-located processors or multiple disparately located processors.

In this example, the apparatus 1713 comprises computer-useable memory 1712 configured to store information and/or instructions for the one or more processors 1713.

The computer-useable memory 1712 is coupled with the bus 1711. The computer-usable memory may comprise one or more of volatile memory and non-volatile memory. The volatile memory may comprise random access memory (RAM). The non-volatile memory may comprise read-only memory (ROM).

In this example, the apparatus 1700 comprises one or more external data-storage units 1780 configured to store information and/or instructions. The one or more external data storage units 1780 are coupled with the apparatus 1700 via an I/O interface 1714. The one or more external data-storage units 1780 may for example comprise a magnetic or optical disk and disk drive or a solid-state drive (SSD).

In this example, the apparatus 1700 further comprises one or more input/output (I/O) devices 1716 coupled via the I/O interface 1714. The apparatus 1700 also comprises at least one network interface 1717. Both the I/O interface 1714 and the network interface 1717 are coupled to the systems bus 1711. The at least one network interface 1717 may enable the apparatus 1200 to communicate via one or more data communications networks 1790. Examples of data communications networks include, but are not limited to, the Internet and a Local Area Network (LAN). The one or more I/O devices 1716 may enable a user to provide input to the apparatus 1700 via one or more input devices (not shown). The one or more I/O devices 1716 may enable information to be provided to a user via one or more output devices (not shown).

In FIG. 17, a (signal) processor application 1740-1 is shown loaded into the memory 1712. This may be executed as a (signal) processor process 1740-2 to implement the methods described herein (e.g., to implement suitable encoders or decoders). The apparatus 1700 may also comprise additional features that are not shown for clarity, including an operating system and additional data processing modules. The (signal) processor process 1740-2 may be implemented by way of computer program code stored in memory locations within the computer-usable non-volatile memory, computer-readable storage media within the one or more data-storage units and/or other tangible computer-readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips or as an Application Specific Integrated Circuit (ASIC).

The apparatus 1700 may therefore comprise a data processing module which can be executed by the one or more processors 1713. The data processing module can be configured to include instructions to implement at least some of the operations described herein. During operation, the one or more processors 1713 launch, run, execute, interpret, or otherwise perform the instructions.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program. It will be appreciated that the apparatus 1700 may comprise more, fewer and/or different components from those depicted in FIG. 17. The apparatus 1700 may be located in a single location or may be distributed in multiple locations. Such locations may be local or remote.

The examples illustrated herein focus on adjusted pixels, however people skilled in the art can easily understand that the same concepts and methods are also applicable to any other types of graphical element such as a voxel.

The examples illustrated herein are useful for video and digital images, and other signals that may require mitigation when bit depth reduction introduces banding artefacts or equivalent problems.

The techniques described herein may be implemented in software or hardware, or may be implemented using a combination of software and hardware. They may include configuring an apparatus to carry out and/or support any or all of techniques described herein.

The above embodiments are to be understood as illustrative examples. Further embodiments are envisaged. It is to be understood that any feature described in relation to any one embodiment may be used alone or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of introducing dither to reduce banding artefacts in a digital image, the banding artefacts resulting from an operation applied to the digital image to reduce the pixel bit depth, the bit depth reduction produces a reduced bit depth version of the digital image which results in pixel information loss, the method comprising:

prior to encoding the digital image:

applying a mask to the digital image, wherein the mask comprises a predetermined pattern independent of pixel intensity or image content, the mask indicating a pattern for selective adjustment of the pixel values in the reduced bit depth version of the digital image; and for each pixel in the digital image:

determining the pixel's location in the mask;

if the mask pattern indicates selective adjustment then:

determining a pixel adjustment factor from the pixel information lost during the bit depth reduction;

applying the pixel adjustment factor to the reduced bit depth version of the pixel;

wherein the mask pattern indicates no selective adjustment for at least one pixel and indicates applying selective adjustment to at least one pixel in five in the horizontal direction, and at least one pixel in five in the vertical direction of the digital image, wherein pixels corresponding to mask locations indicating no selective adjustment are not modified based on the pixel information lost during the bit depth reduction.

2. The method of claim 1, wherein the bit depth reduction converts the bit depth of the pixels from a first bit depth to a second bit depth, wherein the difference between the first bit depth and the second bit depth is 2 bits.

3. The method of claim 2, wherein the first bit depth is 10 bits and the second bit depth is 8 bits.

4. The method of claim 1, wherein the pixel adjustment factor is determined based on the value of the most significant bit of the pixel information lost during the bit depth reduction.

5. The method of claim 1, wherein the pixel adjustment factor increases the value of the reduced bit depth version of the pixel by 1 when the most significant bit of the pixel information lost is 1, and the pixel adjustment factor makes no change when the most significant bit of the pixel information lost is 0.

6. The method of claim 1, wherein the pixel adjustment factor makes no change to the value of the reduced bit depth version of the pixel when the most significant bit of the pixel information lost is 1 and decreases the reduced bit depth version of the pixel by 1 when the most significant bit of the pixel information lost is 0.

7. The method claim 1, wherein the pixel adjustment factor is determined based on a value of a single bit of the pixel information lost during the bit depth reduction regardless of the significance.

8. The method claim 1, wherein the pixel adjustment factor is determined based on the value of each bit lost during the bit depth reduction.

9. The method of claim 8, wherein the influence of each bit lost during the bit depth reduction on the pixel adjustment factor is dependent on the significance of said bit.

10. The method of claim 9, wherein a more significant bit has a greater influence than a lower significant bit.

11. The method of claim 9, wherein when the pixel adjustment factor is derived from two lost bits, the pixel adjustment factor causes the reduced bit depth pixel to be adjusted by a value in of one of the following adjustment groups: 1, 0, −1; and −2, −1, 0, 1 or 2 depending on the value of the pixel information lost during the bit depth reduction.

12. The method of claim 11, wherein the pixel adjustment factor increases the value of the reduced bit depth version of the pixel by 1 when the two most significant bits of the pixel information lost are 10 and the pixel adjustment factor increases the value of the reduced bit depth version of the pixel by 2 when the two most significant bits of the pixel information lost are 11, and otherwise does not change the value of the reduced bit depth version of the pixel.

13. The method of claim 1, wherein the mask indicates applying the pixel adjustment factor to one pixel in two in the horizontal direction, and one pixel in two in the vertical direction.

14. The method of claim 1, wherein the mask indicates applying the pixel adjustment factor to one pixel in two in the horizontal direction, and one pixel in two in the vertical direction for a first portion of the digital image using a pixel adjustment pattern; and the mask indicates an inverse of the pixel adjustment pattern to be applied to a different second portion of the digital image.

15. The method of claim 1, wherein the mask pattern indicates multiple levels of selective adjustment, wherein each level of selective adjustment has a different influence on the likelihood of applying the pixel adjustment factor.

16. The method of claim 15, wherein the multiple levels signal three adjustment levels as follows: zero adjustment, first level adjustment, and second level adjustment.

17. The method of claim 15, wherein the zero adjustment indicates no selective adjustment, the first level adjustment makes no change to when the pixel adjustment factor is applied and the second level adjustment increases the value of the reduced bit depth version of the pixel by 1 only when the two most significant bits of the pixel information lost are 11.

18. The method of claim 1, wherein the method is applied to at least one of the luminance values and the chrominance values of each pixel.

19. The method of claim 1, wherein the method is performed as part of a hierarchical coding scheme.

20. The method of claim 1, wherein the method comprises encoding, at a set of encoders, signals derived from the digital image and the reduced bit depth version of the digital image.

21. The method of claim 20, wherein the encoding at the set of encoders comprises encoding a signal derived from the digital image using a first encoding method and a single derived from the reduced bit depth version of the digital image using a second encoding method, wherein the first encoding method and the second encoding method are different and output part of an LCEVC encoded signal.

22. The method of claim 20, wherein the encoding at the set of encoders comprises encoding a signal derived from the digital image using a first encoding method and a single derived from the reduced bit depth version of the digital image using a second encoding method, wherein the first encoding method and the second encoding method are the same and wherein the first encoding method and the second encoding method generate at least part of a VC-6 encoded signal.

23. A non-transitory computer program product having stored thereon computer executable instructions that, when executed by a processor, cause a computing system to perform a method of introducing dither to reduce banding artefacts in a digital image, the banding artefacts resulting from an operation applied to the digital image to reduce the pixel bit depth, the bit depth reduction produces a reduced bit depth version of the digital image which results in pixel information loss, the method comprising:

prior to encoding the digital image:

applying a mask to the digital image, wherein the mask comprises a predetermined pattern independent of pixel intensity or image content, the mask indicating a pattern for selective adjustment of the pixel values in the reduced bit depth version of the digital image; and for each pixel in the digital image:

determining the pixel's location in the mask;

if the mask pattern indicates selective adjustment then:

determining a pixel adjustment factor from the pixel information lost during the bit depth reduction;

applying the pixel adjustment factor to the reduced bit depth version of the pixel;

wherein the mask pattern indicates no selective adjustment for at least one pixel and indicates applying selective adjustment to at least one pixel in five in the horizontal direction, and at least one pixel in five in the vertical direction of the digital image, wherein pixels corresponding to mask locations indicating no selective adjustment are not modified based on the pixel information lost during the bit depth reduction.

24. A data processing apparatus comprising:

a processor; and non-transitory computer readable memory having stored thereon computer executable instructions that, when executed by a processor, cause the data processing apparatus to perform the following:

apply a mask to a digital image, wherein the mask comprises a predetermined pattern independent of pixel intensity or image content, the mask indicating a pattern for selective adjustment of pixel values in a reduced bit depth version of the digital image; and for each pixel in the digital image:

determining the pixel's location in the mask;

if the mask pattern indicates selective adjustment then:

determining a pixel adjustment factor from the pixel information lost during the bit depth reduction;

applying the pixel adjustment factor to the reduced bit depth version of the pixel;

wherein the mask pattern indicates no selective adjustment for at least one pixel and indicates applying selective adjustment to at least one pixel in five in the horizontal direction, and at least one pixel in five in the vertical direction of the digital image, wherein pixels corresponding to mask locations indicating no selective adjustment are not modified based on the pixel information lost during the bit depth reduction.

* * * * *